US008141088B2

(12) United States Patent (10) Patent No.: US 8,141,088 B2
Morishita et al. (45) Date of Patent: Mar. 20, 2012

(54) MULTITHREADED PROCESSOR

(75) Inventors: Hiroyuki Morishita, Osaka (JP); Shinji Ozaki, Osaka (JP); Takao Yamamoto, Osaka (JP); Masaitsu Nakajima, Osaka (JP)

(73) Assignee: Panasonic Corporation, Osaka (JP)

( * ) Notice: Subject to any disclaimer, the term of this patent is extended or adjusted under 35 U.S.C. 154(b) by 1146 days.

(21) Appl. No.: 11/936,296

(22) Filed: Nov. 7, 2007

(65) Prior Publication Data

US 2008/0109809 A1 May 8, 2008

(30) Foreign Application Priority Data

Nov. 8, 2006 (JP) .................................. 2006-303115

(51) Int. Cl.
 *G06F 9/46* (2006.01)
 *G06F 9/38* (2006.01)
(52) U.S. Cl. ........................................ 718/103; 712/215
(58) Field of Classification Search .................. 718/103; 712/215
 See application file for complete search history.

(56) References Cited

U.S. PATENT DOCUMENTS

| | | | | |
|---|---|---|---|---|
| 5,430,851 | A * | 7/1995 | Hirata et al. .................... | 712/212 |
| 5,987,492 | A * | 11/1999 | Yue ................................. | 718/102 |
| 6,272,517 | B1 | 8/2001 | Yue et al. | |
| 7,082,519 | B2 * | 7/2006 | Kelsey et al. .................. | 712/228 |
| 2004/0216105 | A1 * | 10/2004 | Burky et al. .................... | 718/100 |
| 2004/0216106 | A1 | 10/2004 | Kalla et al. | |
| 2005/0076337 | A1 * | 4/2005 | Mangan .......................... | 718/100 |
| 2005/0149936 | A1 * | 7/2005 | Pilkington ...................... | 718/102 |
| 2006/0179281 | A1 | 8/2006 | Jensen et al. | |

FOREIGN PATENT DOCUMENTS

| | | | |
|---|---|---|---|
| JP | 7-200315 | | 8/1995 |
| JP | 07200315 A | * | 8/1995 |
| JP | 10 124316 | | 5/1998 |
| JP | 10-124316 | | 5/1998 |
| JP | 10124316 A | * | 5/1998 |
| JP | 11-212809 | | 8/1999 |
| JP | 2004-326486 | | 11/2004 |
| JP | 2004 326766 | | 11/2004 |
| JP | 2004326486 A | * | 11/2004 |
| JP | 2005-209105 | | 8/2005 |
| JP | 2005209105 A | * | 8/2005 |

OTHER PUBLICATIONS

English Language Abstract of JP 10-124316.
English Language Abstract of JP 2004-326766.
Nishimura, "A Multithreaded Processor Architecture With Simultaneous Instruction Issuing", SUPERCOMPUTER 49, vol. IX, No. 3, pp. 23-39 (May 1992).
Japan Office action, mail date is May 17, 2011.

* cited by examiner

*Primary Examiner* — Meng An
*Assistant Examiner* — Kevin X Lu
(74) *Attorney, Agent, or Firm* — Greenblum & Bernstein, P.L.C.

(57) ABSTRACT

Provided is a multithreaded processor that can accurately estimate processing time necessary for each thread, and a multithreaded processor that simultaneously executes instruction streams, the multithreaded processor including: a computing unit group that executes instructions; an instruction scheduler that groups the instructions into groups for each of the instruction streams, the instructions being included in the each of instruction streams, and each of the groups being made up of instructions among the instructions to be simultaneously issued to the computing units; an instruction buffer which holds the instructions for each of the groups grouped by the instruction scheduler, the instructions being included in the each of instruction streams; and an issued instruction determining unit that reads the instructions for each of the groups from the instruction buffer in each of execution cycles of the multithreaded processor, and that issues the read instructions to the computing unit group.

19 Claims, 15 Drawing Sheets

MULTITHREADED PROCESSOR

BACKGROUND OF THE INVENTION (1) Field of the Invention

The present invention relates to a multithreaded processor which efficiently uses computing units by issuing instructions of instruction streams in parallel.

(2) Description of the Related Art

When media processing including compression and decompression of digitized video data and audio data is performed, the computation amount becomes very large. Thus, for performing such media processing, special-purpose hardware, high-performance Digital Signal Processor (DSP), and the like are becoming widely available.

In the media processing, many kinds of standards, such as Moving Picture Experts Group (MPEG) 2, MPEG4, H.263, and H.264 are in practical use. Thus, digital Audio-Visual (AV) devices need to support requirements in diverse media processing of different standards. Furthermore, complexity of each media processing is increasing, and a size of an image, the number of channels of audio, and the like are increasing, which further increase the computation amount.

Under these circumstances, a method for installing special-purpose hardware for performing the aforementioned media processing, and a method for realizing flexible processing depending on software are used.

Although it is possible to realize high-performance processing using the method for installing special-purpose hardware, there is a problem that a circuit scale is increased when the number of functions to be realized is many. Furthermore, there is also a problem that it is necessary to install new hardware when adding an additional function.

On the other hand, according to the method for realizing the media processing using software, it is possible to realize multi-functions and to add a function easily. However, compared to the method for installing special-purpose hardware, the method using software poses a problem in performance.

For this problem, performance is being improved using a high-performance multithreaded processor having the improved computation efficiency by executing programs in parallel (for example, refer to "A Multithreaded Processor Architecture with Simultaneous Instruction Issuing," In SUPERCOMPUTER, 49, volume IX, number 3, May 1992).

However, in the method for realizing the media processing using such multithreaded processor, there exists a problem of allocating performance to plural programs.

More specifically, since time allocated to a thread for video processing and to a thread for audio processing becomes short, the video processing and the audio processing are not performed in time. Thus, there exists a problem of frame dropping from video and sound skipping from audio.

Thus, it is necessary to guarantee that processing on a thread requiring real-time performance is completed within a certain period of time. For this, it is necessary to accurately estimate processing time required in each thread.

SUMMARY OF THE INVENTION

The present invention is conceived in view of these circumstances, and the object is to provide a multithreaded processor that can accurately estimate processing time required in each thread.

Furthermore, another object is to provide a multithreaded processor that can guarantee that processing on a thread requiring real-time performance is completed within a certain period of time.

In order to obtain the aforementioned object, the multithreaded processor according to the present invention is a multithreaded processor that executes instruction streams simultaneously and includes: computing units that execute instructions; a grouping unit that groups the instructions into groups for each of the instruction streams, the instructions being included in the each of instruction streams, and each of the groups being made up of instructions to be simultaneously issued to the computing units; an instruction buffer which holds the instructions for each of the groups obtained by the grouping unit, the instructions being included in the each of instruction streams; and an instruction issuing unit that reads the instructions for each of the groups from the instruction buffer in each of execution cycles of the multithreaded processor, and that issues the read instructions to the computing units.

The instructions included in the instruction stream are grouped in each group. Thus, it is possible to count the number of groups for each instruction stream. Accordingly, it is possible to accurately estimate processing time required in each instruction stream, in other words, each thread.

It is preferable that the multithreaded processor further includes: a first priority queue which stores identifiers for the each of the instruction streams; and a priority determining unit that selects at least one of the identifiers from the first priority queue by prioritizing the identifiers and switching priorities of the identifiers in each of the execution cycles of the multithreaded processor, and that determines at least one of the selected identifiers as priority information, wherein the instruction issuing unit, in each of the execution cycles of the multithreaded processor: determines an instruction stream based on the priority information determined by the priority determining unit; (ii) reads, from the instruction buffer, a group of instructions included in the determined instruction stream; and (iii) issues the read instructions to the computing units.

The priority determining unit changes the priority information in each of the execution cycles. Furthermore, the instruction issuing unit determines an instruction stream based on the priority information that is changed in each of the execution cycles, and issues an instruction of the instruction stream. With this, it is possible to allocate predetermined performance to the instruction stream identified by the priority information, and to guarantee that processing on a thread (instruction stream) requiring real-time performance is completed within a certain period of time.

According to the present invention, it is possible to provide the multithreaded processor that can accurately estimate processing time required in each thread.

Furthermore, it is possible to provide the multithreaded processor that can guarantee that processing on a thread requiring real-time performance is completed within a certain period of time.

FURTHER INFORMATION ABOUT TECHNICAL BACKGROUND TO THIS APPLICATION

The disclosure of Japanese Patent Application No. 2006-303115 filed on Nov. 8, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

The embodiments of the present invention are to be described with reference to the diagrams hereinafter.

First Embodiment

Figure 1:
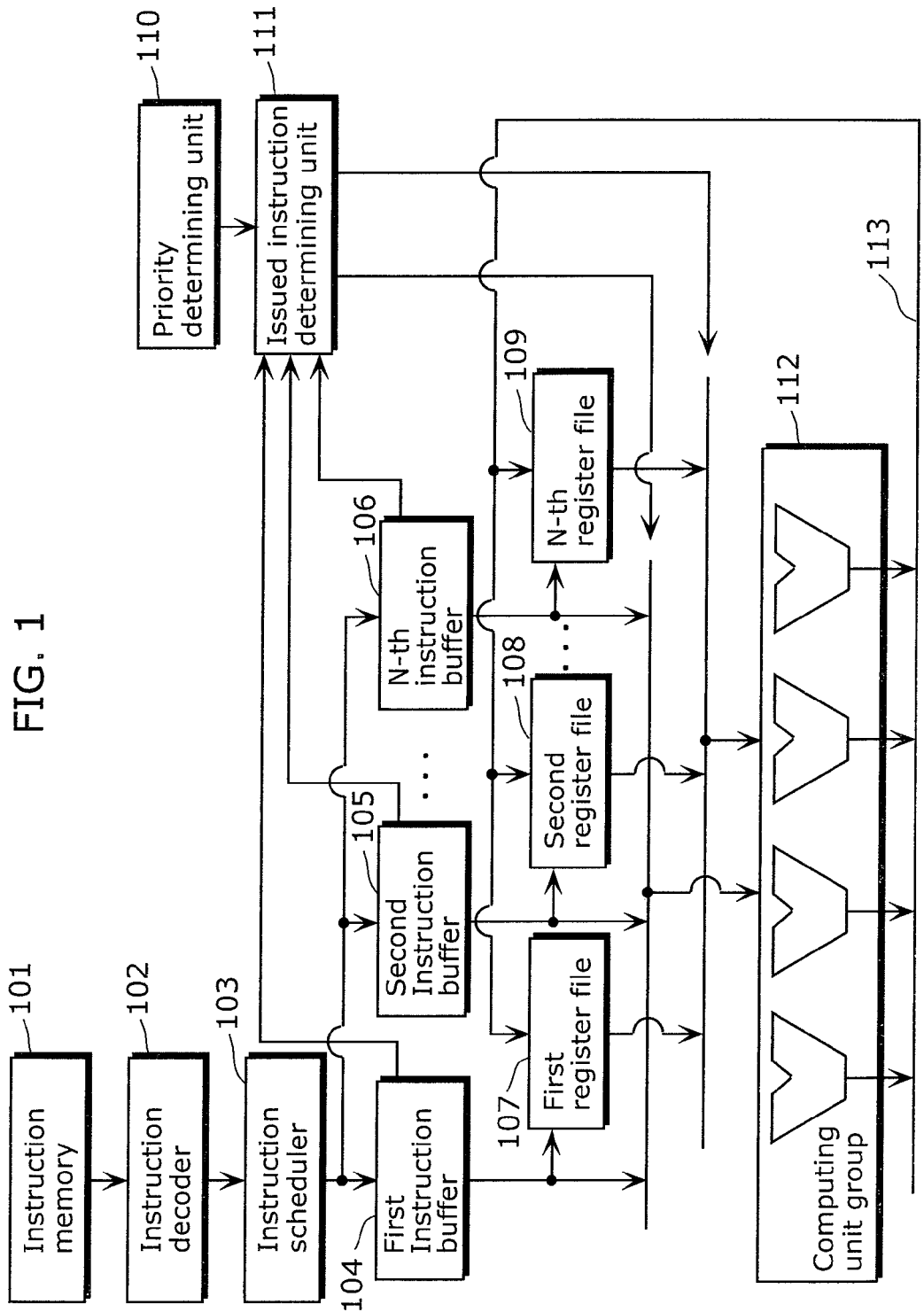
FIG. 1 is a block diagram showing hardware configuration of a multithreaded processor according to the first embodiment of the present invention.

FIG. 1 is a block diagram showing hardware configuration of a multithreaded processor according to the first embodiment of the present invention.

The multithreaded processor is a processor that independently executes N number of instruction streams (N number of threads), where N is an integer equal to or larger than 2. The multithreaded processor includes an instruction memory 101, an instruction decoder 102, an instruction scheduler 103, N number of instruction buffers (a first instruction buffer 104, a second instruction buffer 105, . . . , an N-th instruction buffer 106), N number of register files (a first register file 107, a second register file 108, . . . , an N-th register file 109), a priority determining unit 110, an issued instruction determining unit 111, a computing unit group 112, and a write-back bus 113.

The instruction memory 101 is a memory that holds instructions executed in a multithreaded processor, and holds N numbers of instruction streams each of which is executed independently.

The instruction decoder 102 is a processing unit that reads, from the instruction memory 101, an instruction included in an instruction stream and that decodes the instruction. The detailed operations of the instruction decoder 102 are to be described later.

The instruction scheduler 103 is a processing unit that reads an instruction from the instruction decoder 102 and performs instruction scheduling. The detailed operations of the instruction scheduler 103 are to be described later.

The first instruction buffer 104 is a storing unit that receives, from the instruction scheduler 103, an instruction included in the scheduled first instruction stream and that holds the instruction.

The second instruction buffer 105 is a storing unit that receives, from the instruction scheduler 103, an instruction included in the scheduled second instruction stream and that holds the instruction.

The N-th instruction buffer 106 is a storing unit that receives, from the instruction scheduler 103, an instruction included in the scheduled N-th instruction stream and that holds the instruction.

The first register file 107 is a register group that holds data to be read and written by executing the first instruction stream held in the first instruction buffer 104.

The second register file 108 is a register group that holds data to be read and written by executing the second instruction stream held in the second instruction buffer 105.

The N-th register file 109 is a register group that holds data to be read and written by executing the N-th instruction stream held in the N-th instruction buffer 106.

The priority determining unit 110 is a processing unit that determines a priority of the N number of instruction streams. The detailed operations of the priority determining unit 110 are to be described later.

The issued instruction determining unit 111 is a processing unit that implements a virtual processor. In other words, the issued instruction determining unit 111 receives a priority from the priority determining unit 110 and receives instruction buffer information indicating whether or not an instruction can be executed from each of the first instruction buffer to the N-th instruction buffer 106. Furthermore, the issued instruction determining unit 111 selects an instruction buffer in which an instruction of an instruction stream to be issued and a register file that is necessary for the instruction stream are held, based on the priority and the instruction buffer information received from the priority determining unit 110.

The computing unit group 112 is a processing unit including computing units, such as an adder and a multiplier. The write-back bus 113 is a bus for writing output data from the computing unit group 112 back to the first register file 107 to the N-th register file 109.

Next, operations of the instruction memory 101, the instruction decoder 102, the instruction scheduler 103, and the first instruction buffer 104 to the N-th instruction buffer 106 are described in details hereinafter.

Figure 2:
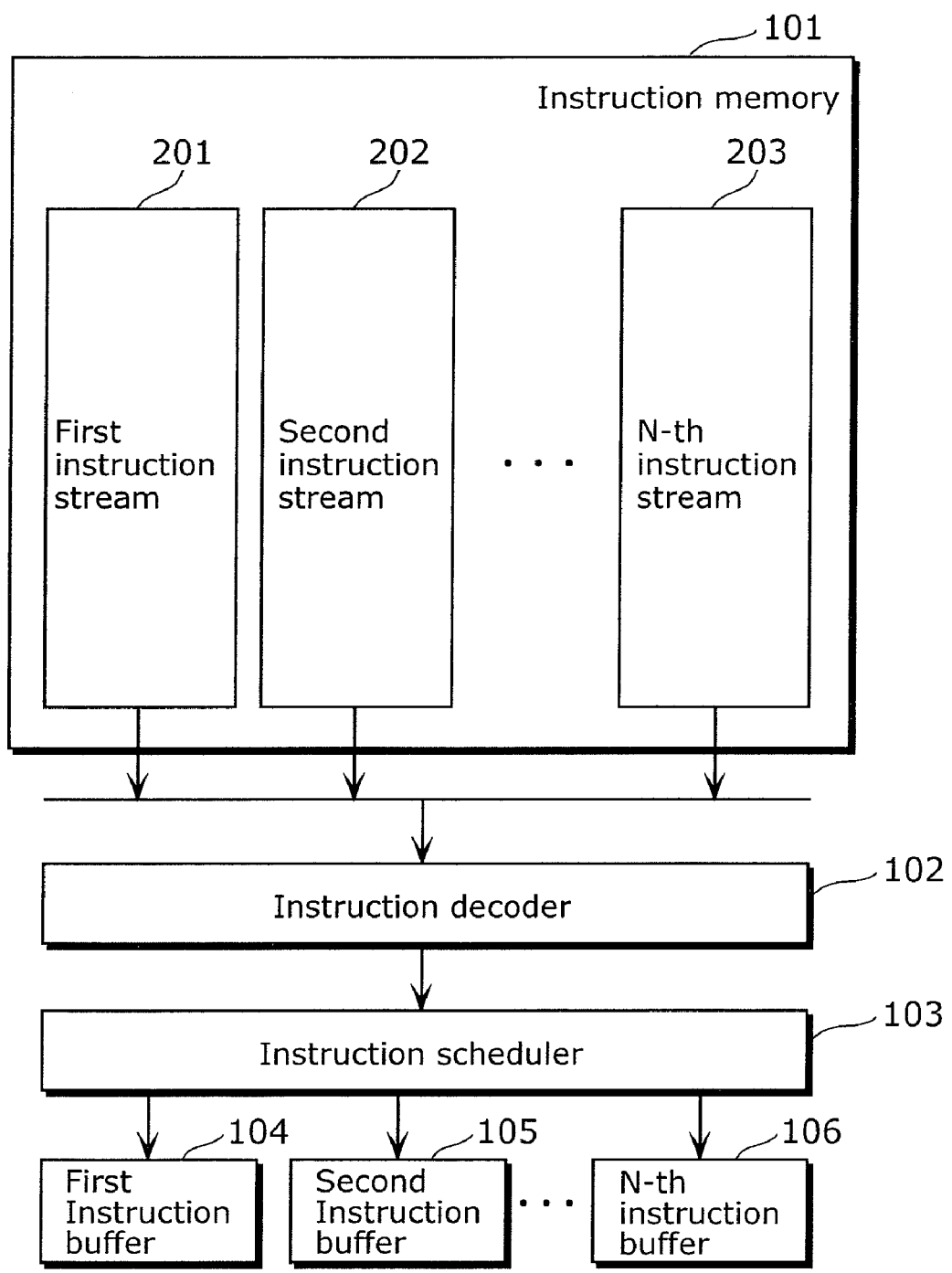
FIG. 2 is a diagram for describing operations of an instruction memory, an instruction decoder, an instruction scheduler, and the first instruction buffer to the N-th instruction buffer according to the first embodiment.

FIG. 2 is a diagram for describing the operations of the instruction memory 101, the instruction decoder 102, the instruction scheduler 103, and the first instruction buffer 104 to the N-th instruction buffer 106.

In the instruction memory 101, N number of instruction streams including from the first instruction stream 201 to the N-th instruction stream 203 are stored.

The instruction decoder 102 selects an instruction stream each from the first instruction stream 201 to the N-th instruction stream 203 which are stored in the instruction memory 101, and decodes instructions of the selected instruction streams. Note that the instruction decoder 102 may monitor an accumulating status of instructions in each of the first instruction buffer 104 to the N-th instruction buffer 106, select instruction streams in ascending order of accumulated instructions in the streams, and decode the instructions included in the selected instruction streams.

The instruction scheduler 103 receives the decoded instructions from the instruction decoder 102, and groups the instructions capable of being issued simultaneously into a group. In other words, the instruction scheduler 103 groups the instructions capable of being issued at one cycle into a group for each of the instruction streams read from the instruction memory 101. The instruction scheduler 103 stores the grouped instructions in one of the instruction buffers corresponding to the instruction stream including the instructions, among the first instruction buffer 104 to the N-th instruction buffer 106.

In each of the first instruction buffer 104 to the N-th instruction buffer 106, an instruction decoded by the instruction decoder 102 and grouped by the instruction scheduler 103 is held. Here, as a method for indicating a group of an instruction, a distinct identifier may be given to each group, or an identifier indicating a boundary between groups may be given to an instruction located in a boundary between the groups.

Figure 3B:
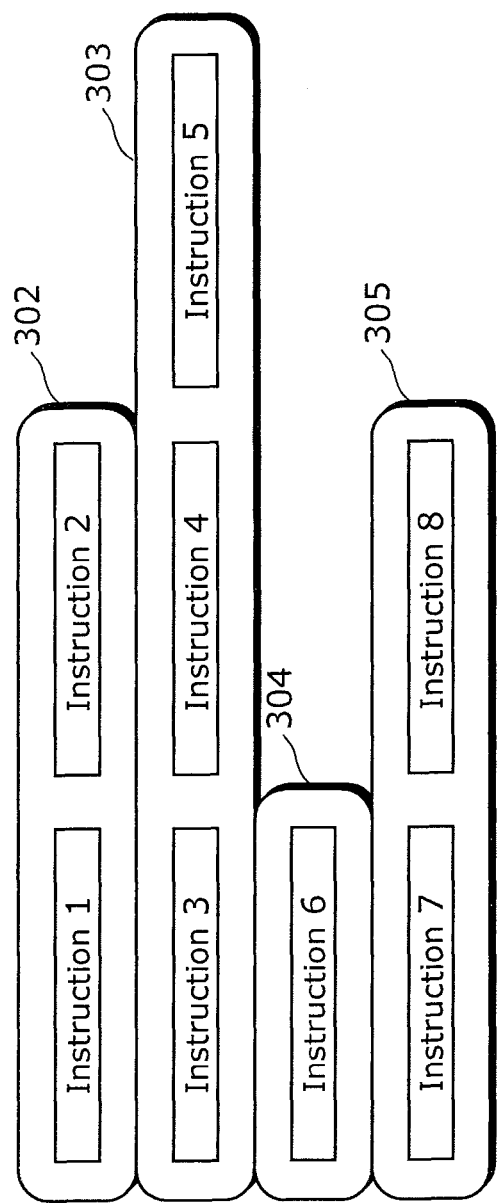
FIGS. 3A and 3B are diagrams for describing scheduling processing on instructions for a single instruction stream using the instruction scheduler according to the first embodiment.
Figure 3A:
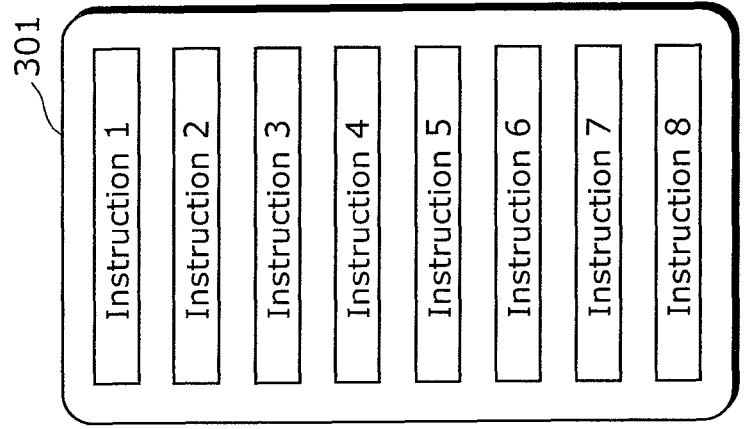

FIGS. 3A and 3B are diagrams for describing scheduling processing of instructions for a single instruction stream using the instruction scheduler 103.

For example, as shown in FIG. 3A, scheduling for arbitrary successive 8 instructions included in an instruction stream 301 is considered.

The instruction scheduler 103 schedules instructions by integrating instructions capable of being executed simultaneously into an identical group, based on data dependencies present between the instructions.

As a result, for example, as shown in FIG. 3B, the first two instructions, Instructions 1 and 2 are grouped into a first group 302 from the instruction stream 301. Next three instructions, Instructions 3 to 5, are grouped into a second group 303. Next Instruction 6 is grouped into a third group 304. Next Instructions 7 and 8 are grouped into a fourth group 305.

Instructions 1 and 2 included in the first group 302 can be issued in the first cycle. Instructions 3 to 5 included in the second group 303 can be issued in the second cycle. Instruction 6 included in the third group 304 can be issued in the third cycle. Instructions 7 and 8 included in the fourth group 305 can be issued in the fourth cycle. Note that each group indicates a group of instructions capable of being issued in a cycle. Thus, there is no need to issue instructions in successive cycles in an order from the first group 302 to the fourth group 305, and the instructions may be issued in irregular cycles, and the groups of the instructions to be issued need not be arranged in the aforementioned order.

Note that various methods are conceived in grouping instructions capable of being issued simultaneously in a multithreaded processor having computing units. For example, there are methods for creating groups including instructions capable of being issued simultaneously, based on the number of instructions capable of being issued simultaneously and the number of computing resources, while the order for issuing the instructions remains the same. Furthermore, it is possible to perform the aforementioned processes in advance using a complier or the like. In such a case, the instruction scheduler 103 recognizes a boundary between groups and performs grouping, based on a predetermined identifier included in each of the instructions of an instruction stream and the number of instructions.

The present invention is characterized in that instructions including instructions of plural instruction streams are not optimized for achieving performance predicted, in advance, by the software developer. This is for preventing execution of an instruction of a target instruction stream from being affected by appearance of instructions from other instruction streams. As a result, by counting the number of groups for each instruction stream, the software developer can easily calculate performance necessary for each instruction stream, in other words, time to be allocated for each of the instruction streams for executing a virtual processor.

Figure 4:
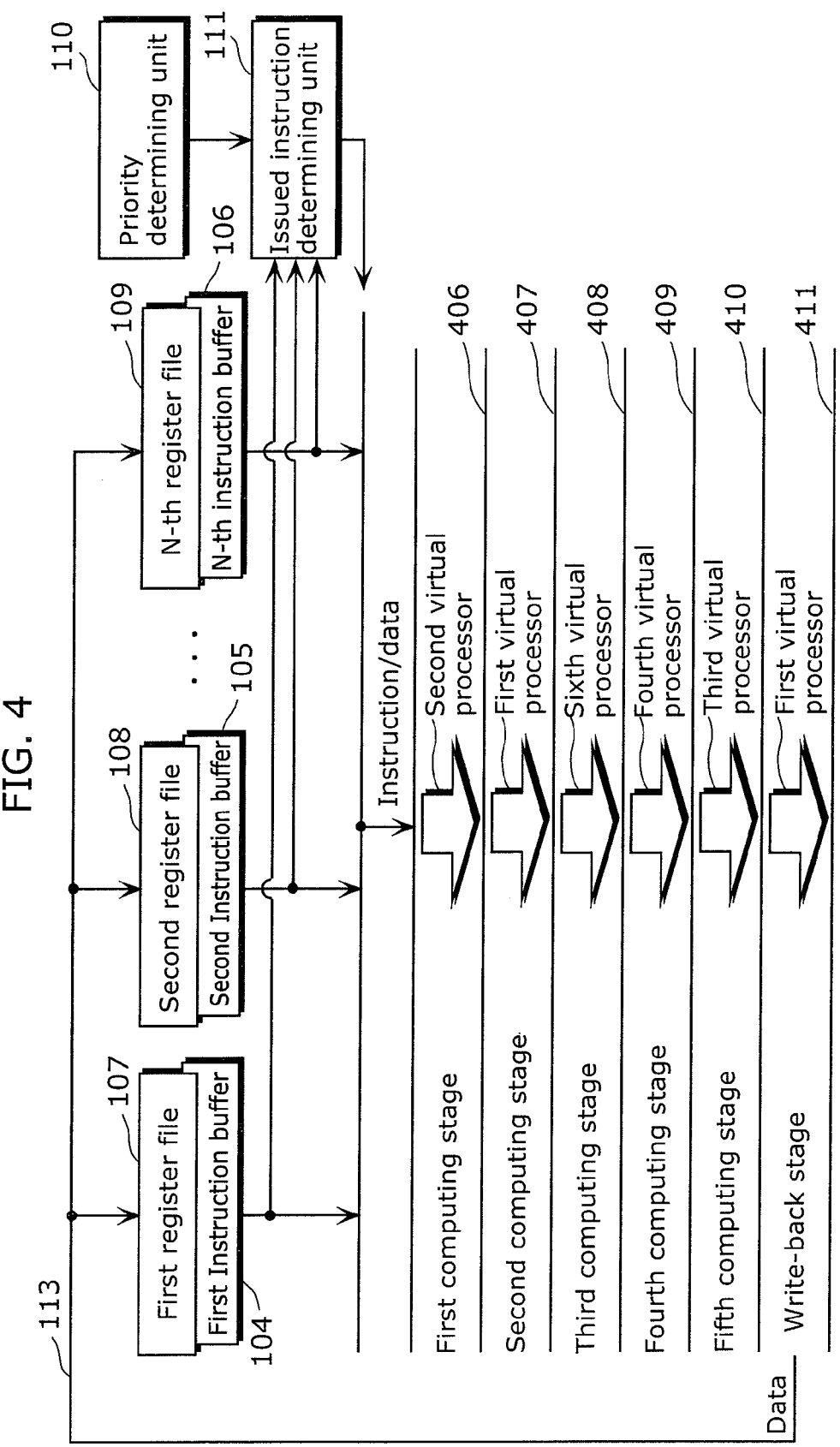
FIG. 4 is a diagram describing fine-grained multithreaded processing using the first instruction buffer to the N-th instruction buffer, the first register file to the N-th register file, the computing unit group, and the write-back bus according to the first embodiment.

FIG. 4 is a diagram describing fine-grained multithreaded processing using the first instruction buffer 104 to the N-th instruction buffer 106, the first register file 107 to the N-th register file 109, the computing unit group 112, and the write-back bus 113.

As described above, the issued instruction determining unit 111 implements a virtual processor by selecting an instruction buffer in which an instruction of an instruction stream to be issued are stored and a register file necessary for the instruction stream, based on priority information received from the priority determining unit 110 and instruction buffer information received from each of the instruction buffers.

Here, the multithreaded processor executes pipeline processing using the computing unit group 112. The number of stages is, for example, six including a first computing stage 406, a second computing stage 407, a third computing stage 408, a fourth computing stage 409, a fifth computing stage 410, and a write-back stage 411.

In each of the stages from the first computing stage 406 to the fifth computing stage 410 executes an instruction included in one of the instruction streams from among the N-th number of instruction streams.

Furthermore, processing for writing computing results performed in the first computing stage 406 to the fifth computing stage 410, back to one of the first register file 107 to the N-th register file 109 is executed in the write-back stage 411.

As such, when the issued instruction determining unit 111 switches instruction streams and issues the instruction streams successively in each of the pipelined computing stages, it becomes possible to implement virtual processors. For example, the second virtual processor that executes the second instruction stream is allocated to the first computing stage 406.

Using such a multithreaded pipeline, it is possible to substantially reduce limitations for issuing an instruction that are caused by data dependencies.

Figure 5:
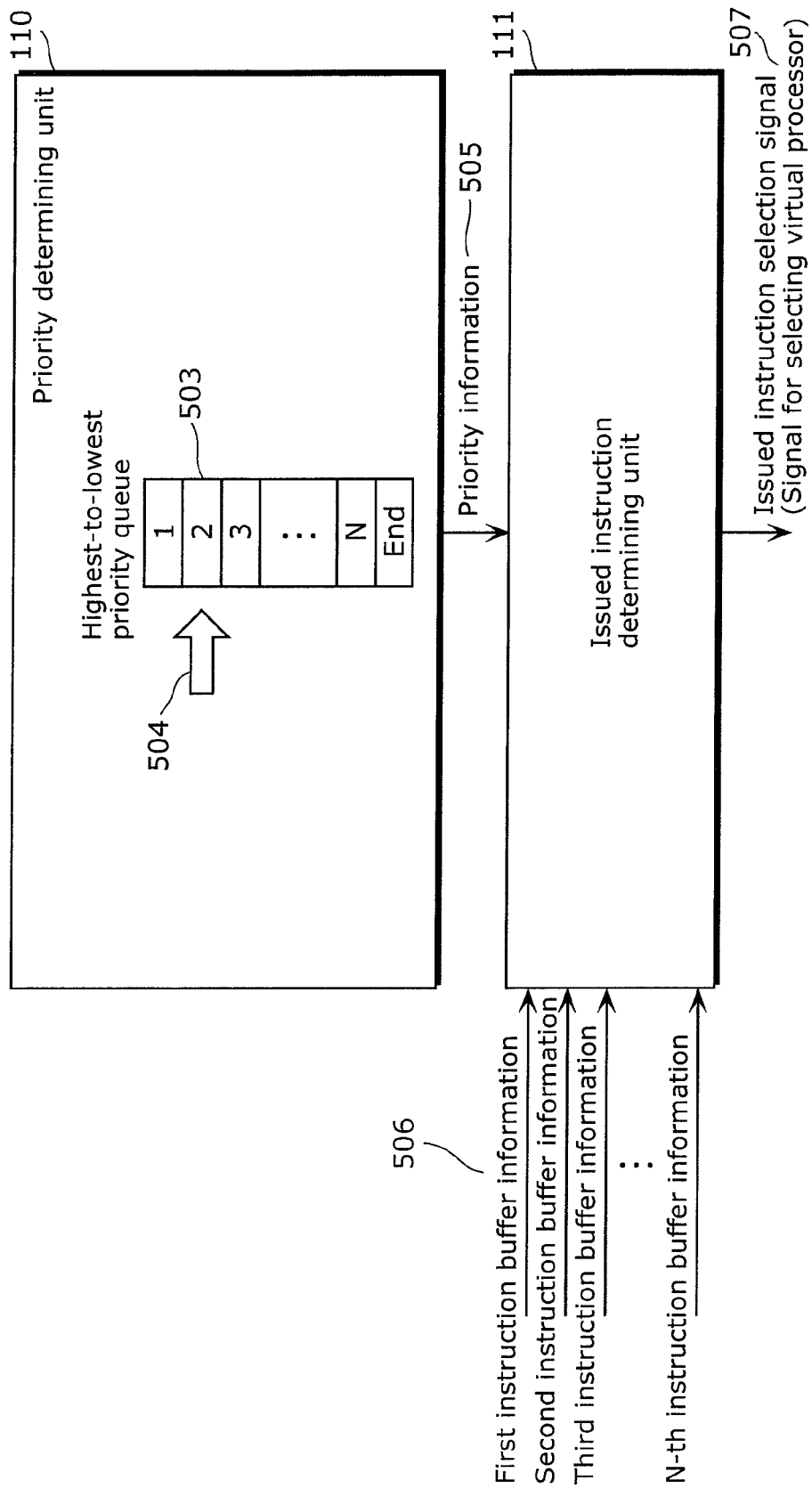
FIG. 5 is a diagram for operations of the priority determining unit and the issued instruction determining unit according to the first embodiment.

Next, a method for determining priorities is to be described. FIG. 5 is a diagram for describing operations of the priority determining unit 110 and the issued instruction determining unit 111.

The priority determining unit 110 includes a highest-to-lowest priority queue 503 in which the number of virtual processors indicating priorities for issuing each of instructions (the number of threads and instruction streams) is registered. A highest priority pointer 504 is a pointer indicating an entry to be a priority in the highest-to-lowest priority queue 503.

The priority determining unit 110 obtains priority information 505 indicating a priority of a virtual processor in an operation cycle based on the highest-to-lowest priority queue 503 and the entry indicated by the highest priority pointer 504, and outputs the information.

The specific examples of obtaining the priority information 505 are to be described hereinafter. The priority determining unit 110 determines priorities for every cycle based on a virtual processor number registered in the highest-to-lowest priority queue 503. For example, the virtual processor numbers are registered in the highest-to-lowest priority queue 503 in ascending order of "1, 2, 3 . . . N, End". Here, "END" is an identifier indicating a last entry of the highest-to-lowest priority queue 503.

When the highest priority pointer 504 points the second entry of the highest-to-lowest priority queue 503, the priority information 505 in the cycle becomes "2, 3 . . . N, 1". In other words, the priority of the virtual processor number is determined in an order from the entry pointed by the highest priority pointer 504 of the highest-to-lowest priority queue 503 to the one entry prior to the last entry, and "2, 3 . . . N" as the first half of the priority information 505 is obtained. Furthermore, virtual processor numbers each indicating a priority are determined in an order from a top entry of the highest-to-lowest priority queue 503 to the one entry prior to the last entry pointed by the highest priority pointer 504, and 1 as the second half of the priority information 505 is obtained. By combining the first half and the second half of the priority information 505, it is possible to obtain the priority information 505 "2, 3 . . . N, 1". In other words, in this cycle, instructions are issued in an order from the second virtual processor, the third virtual processor, . . . , the N-th virtual processor, to the first virtual processor by priority.

In the next cycle, the highest priority pointer 504 advances one entry, pointing the third entry of the highest-to-lowest priority queue 503. Note that although the transition of the highest priority pointer 504 does not depend on whether or not an instruction is issued to a target virtual processor having the highest priority, the highest priority pointer 504 is transitioned always in every cycle. Thus, the priority information 505 in this cycle becomes "3, . . . , N, 1, 2".

The same processing is repeated, and when the highest priority pointer 504 points the last entry in which the identifier "END" is stored, the highest priority pointer 504 is transitioned to the first entry. In the present embodiment, although it is assumed that the virtual processor numbers of N number of virtual processors are respectively registered in the highest-to-lowest priority queue 503, a plurality of the same virtual processor numbers may be registered.

The issued instruction determining unit 111 receives the instruction buffer information 506 respectively outputted from each of the first instruction buffer 104 to the N-th instruction buffer 106. The instruction buffer information 506 is information whether or not an issuable instruction is present in the cycle, among grouped instructions held in each of the instruction buffers. For example, regardless of whether or not each of the instruction buffers is empty, there is data dependencies between instructions previously issued. When there is any factor that prevents an instruction from being issued due to incompletion of computation of the instruction and the like, the instruction buffer information 506 includes a signal indicating that there is no issuable grouped instruction in the corresponding instruction buffer.

The issued instruction determining unit 111 outputs an issued instruction selection signal 507 for selecting a virtual processor that issues an instruction in an operation cycle.

In other words, the issued instruction determining unit 111 checks the instruction buffer information 506 according to the priority information 505, and confirms whether or not there is a grouped instruction capable of being issued to the virtual processor having the highest priority. When an issuable grouped instruction is present, the issued instruction determining unit 111 outputs, as the issued instruction selection signal 507, a signal that selects the virtual processor having the highest priority.

When an issuable grouped instruction is not present, the issued instruction determining unit 111 outputs, as the issued instruction selection signal 507, a signal indicating that there is no instruction to be issued. Here, in the present embodiment, when there is no instruction to be issued to the virtual processor having the highest priority, the issued instruction determining unit 111 does not issue an instruction, regardless of whether or not having an instruction to be issued for another virtual processor. However, the issued instruction determining unit 111 may issue an instruction, when having an instruction capable of being issued to another virtual processor. Note that in such a case, there is no change in the transition rule of the highest priority pointer 504.

Figure 6:
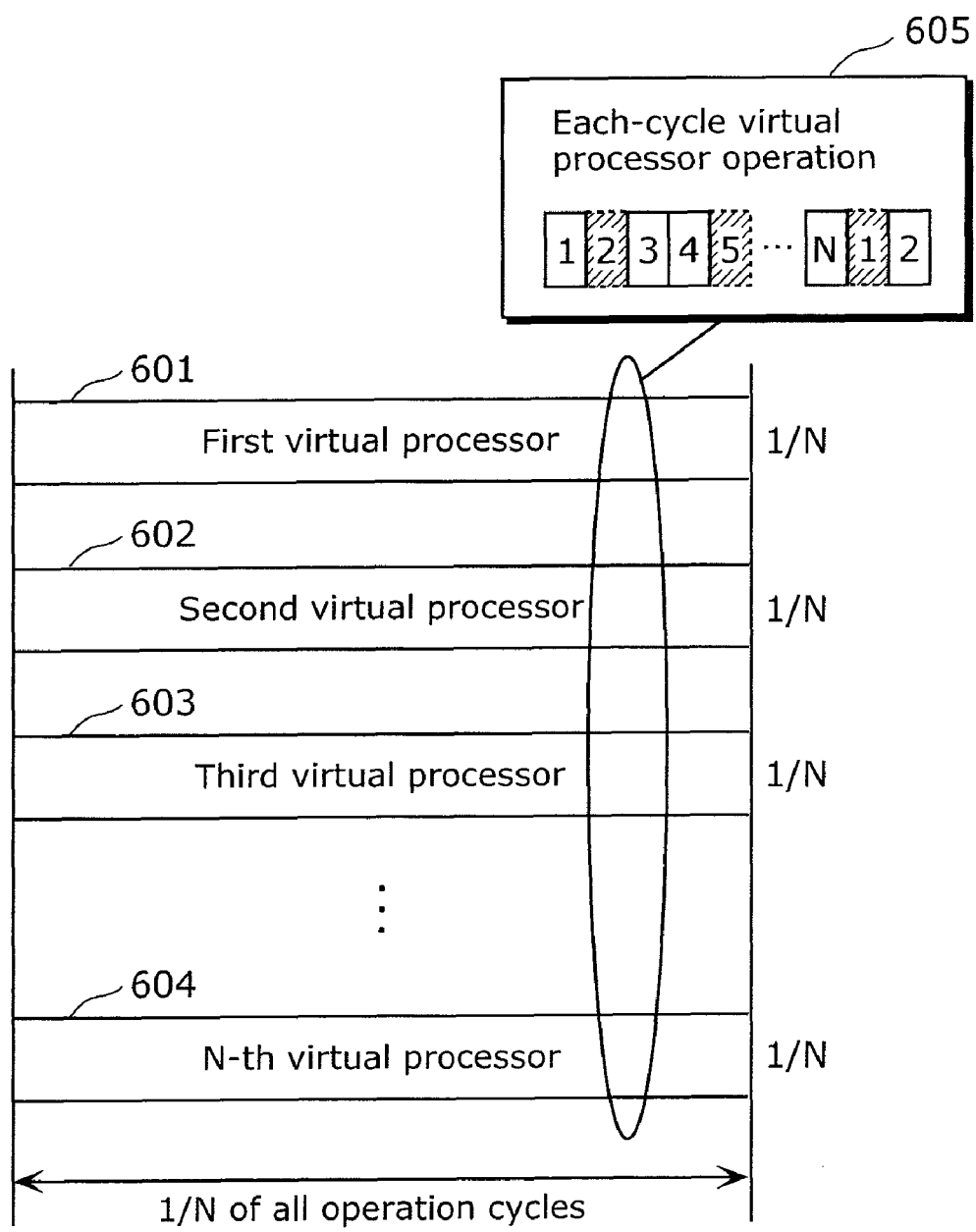
FIG. 6 is a diagram showing performance allocated for each virtual processor, in the multithreaded processor according to the first embodiment.

FIG. 6 is a diagram showing the performance allocated for each virtual processor, in the multithreaded processor according to the present embodiment.

As shown in FIG. 6, each of the following performance is for 1/N of all operation cycles: performance 601 allocated for the first virtual processor; performance 602 allocated for the second virtual processor; performance 603 allocated for the third virtual processor; . . . , and performance 604 allocated for the N-th virtual processor.

Note that an each-cycle virtual processor operation 605 indicates virtual processor numbers allocated for each cycle, and indicates the determined highest priority for each cycle in an order from the first virtual processor to the N-th virtual processor. Note that the second, the fifth, and the first virtual processors that are represented by broken lines indicate that no instruction is issued due to a reason, for example, that there is no instruction to be issued as described above, when an instruction is to be issued to the second, the fifth, and the first virtual processors.

As described above, according to the present embodiment, it is possible to allocate the uniform performances 601 to 604 to all of the first virtual processor to the N-th virtual processor. Note that although an instruction is not issued in the cycles represented by the broken lines from among the cycles indicated in the each-cycle virtual processor operation 605, it is assumed that performance has been allocated to a target processor in a cycle in which an instruction is not issued.

Furthermore, the instruction scheduler 103 groups instructions for each of the instruction streams. Thus, it is possible to count the number of instruction groups capable of being executed simultaneously for each of the instruction streams (each of the threads). With this, it is possible to accurately estimate the number of cycles for each thread, in other words, the processing time necessary for each of the thread.

With this, it is possible to allocate threads requiring real-time performance, by varying the virtual processor numbers registered in the highest-to-lowest priority queue 503 according to a ratio of processing time necessary for each of the thread, thereby completing a certain amount of processing within a predetermined period of time.

Second Embodiment

Next, the multithreaded processor according to the second embodiment of the present invention is to be described.

Although the multithreaded processor according to the second embodiment has the same configuration as the multithreaded processor according to the first embodiment shown in FIG. 1, it differs in the priority determining unit 110 and the issued instruction determining unit 111. The multithreaded processor according to the second embodiment is to be described hereinafter, focusing on the priority determining unit and the issued instruction determining unit.

Figure 7:
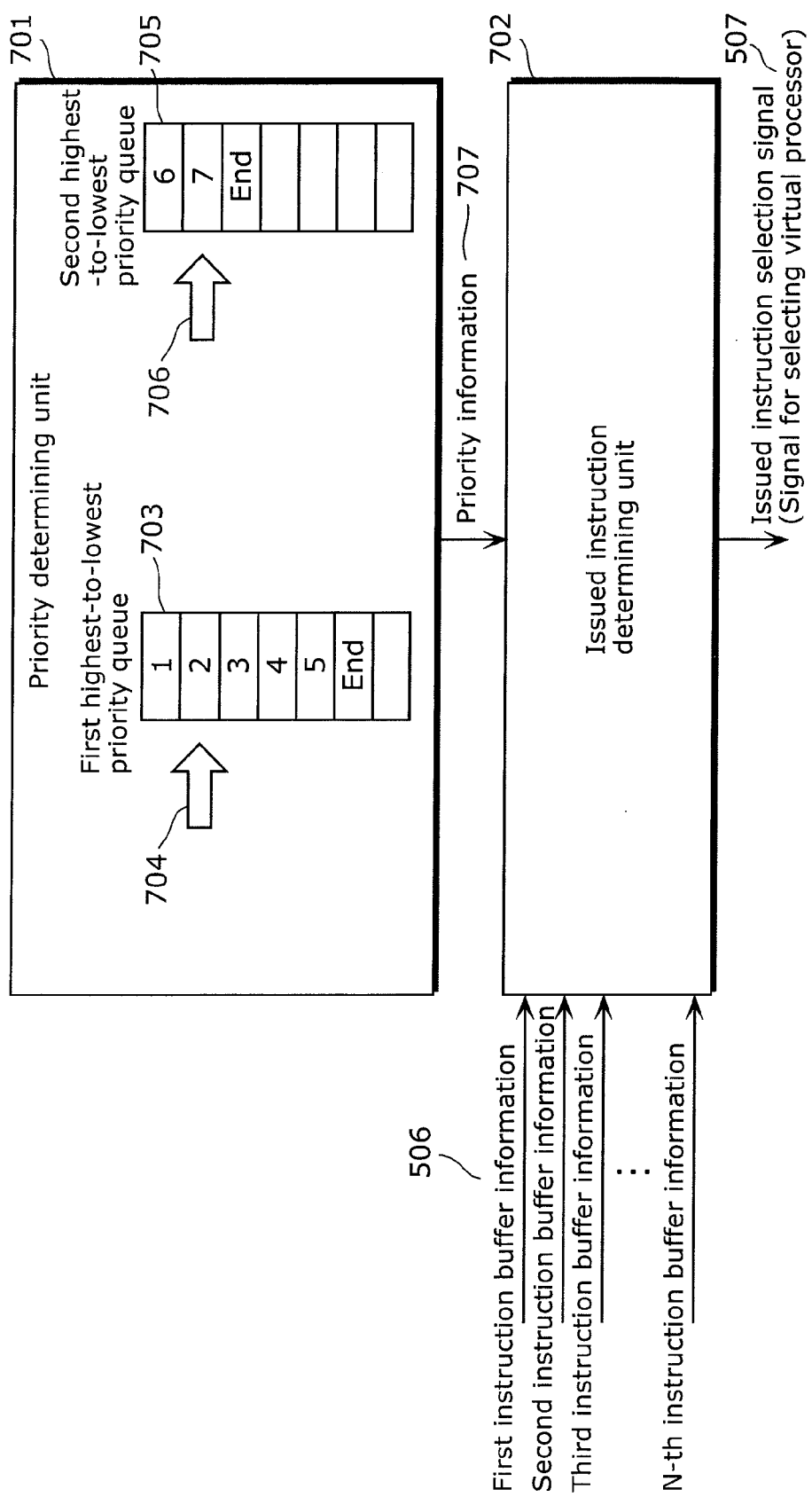
FIG. 7 is a diagram for describing configuration and operations of the priority determining unit and the issued instruction determining unit according to the second embodiment.

FIG. 7 is a diagram for describing configuration and operations of a priority determining unit 701 and an issued instruction determining unit 702.

The priority determining unit 701 is provided, instead of the priority determining unit 110 in the multithreaded processor shown in FIG. 1, and is a processing unit that determines priorities for the N number of instruction streams for each of the operation cycles and that outputs priority information 707 indicating priorities for each virtual processor.

The issued instruction determining unit 702 is provided, instead of the issued instruction determining unit 111 in the multithreaded processor shown in FIG. 1, and is a processing unit that implements a virtual processor. In other words, the issued instruction determining unit 702 receives priority information 707 from the priority determining unit 701, and receives instruction buffer information 506 indicating whether or not an instruction can be executed from each of the first instruction buffer 104 to the N-th instruction buffer 106. Furthermore, the issued instruction determining unit 702 selects an instruction buffer in which an instruction of an instruction stream to be issued is held and a register file that is necessary for the instruction stream, based on the received priority information 707 and the instruction buffer information 506.

The priority determining unit 701 includes: a first highest-to-lowest priority queue 703 in which the number of virtual processors indicating priorities for issuing each of instructions (the number of threads and instruction streams) are registered; and a second highest-to-lowest priority queue 705 in which the number of virtual processors that is not to be issued by priority and that has the second highest priority is registered.

A first highest priority pointer 704 is a pointer indicating an entry to be the highest priority in the first highest-to-lowest priority queue 703. A second highest priority pointer 706 is a pointer indicating an entry that stores the number of virtual processor in which an instruction to be issued is included, in the highest-to-lowest priority queue 705.

The specific examples of obtaining the priority information 707 are to be described hereinafter. The priority determining unit 701 determines priorities for every cycle based on the virtual processor numbers registered in the first highest-to-lowest priority queue 703 and virtual processor numbers registered in the second highest-to-lowest priority queue 705. For example, the virtual processor numbers are registered in the first highest-to-lowest priority queue 703 in an order of "1, 2, 3, 4, 5, End". Furthermore, the virtual processor numbers are registered in the second highest-to-lowest priority queue 705 in an order of "6,7, End". Here, "END" is an identifier indicating the last entry of the first highest-to-lowest priority queue 703 and the second highest-to-lowest priority queue 705.

In a cycle, the first highest priority pointer 704 points the second entry of the first highest-to-lowest priority queue 703, and the second highest priority pointer 706 points the second entry of the second highest-to-lowest priority queue 705. Here, the priority information 707 in this cycle becomes "2,3,4,5,1,7,6". In other words, the priority determining unit 701 obtains the first half of the priority information 707, "2,3,4,5,1" based on the first highest-to-lowest priority queue 703 and the first highest priority pointer 704. Furthermore, the priority determining unit 701 obtains the second half of the priority information 707, "7,6" based on the second highest-to-lowest priority queue 705 and the second highest priority pointer 706. The first half and second half of the priority information 707 are obtained in the same manner as the method for obtaining the priority information 505 using the priority determining unit 110 described with reference to FIG. 5. Thus, the detailed description is not repeated herein.

In the next cycle, the first highest priority pointer 704 advances one entry, pointing the third entry of the first. highest-to-lowest priority queue 703, and the second highest priority pointer 706 advances one entry, pointing the first entry of the second highest-to-lowest priority queue 705. Note that although the transition of the first highest priority pointer 704 does not depend on whether or not an instruction is issued to a target virtual processor having the highest priority, the first highest priority pointer 704 is transitioned always in every cycle. On the other hand, although the transition of the second highest priority pointer 706 does not depend on whether or not an instruction is issued to a virtual processor having the non-highest priority, it is possible to cause the second highest priority pointer 706 to be transitioned always in every cycle and it may be transitioned only when an instruction is issued. Thus, the priority information 707 in this cycle becomes "3,4,5,1,2,6,7". The same processing is repeated, and when the first highest priority pointer 704 points the last entry in which the identifier "END" is stored, the first highest priority pointer 704 is transitioned to the first entry. When the second highest priority pointer 706 points the last entry in which the identifier "END" is stored, the second highest priority pointer 706 is transitioned to the first entry. In the present embodiment, although it is assumed that the virtual processor numbers of five virtual processors from the first virtual processor to the fifth virtual processor are respectively registered in the first highest-to-lowest priority queue 703, a plurality of the same virtual processor numbers may be registered. Furthermore, although it is assumed that the virtual processor numbers of the sixth virtual processor and the seventh virtual processor, which are not registered in the first highest-to-lowest priority queue 703, are registered in the non-priority determining unit 705, a plurality of the same virtual processor numbers may be registered.

The issued instruction determining unit 702 outputs an issued instruction selection signal 507 for selecting a virtual processor that issues an instruction in an operation cycle.

In other words, the issued instruction determining unit 702 checks the instruction buffer information 506 according to a priority of the priority information 707, and confirms whether or not there is a grouped instruction capable of being issued to the virtual processor having the highest priority. When an issuable grouped instruction is present, the issued instruction determining unit 702 outputs, as the issued instruction selection signal 507, a signal that selects the virtual processor having the highest priority.

When the issuable grouped instruction is not present, the issued instruction determining unit 702 confirms whether or not there is a grouped instruction capable of being issued to the virtual processor and having the second highest priority. When there is such an instruction, the issued instruction determining unit 702 outputs, as the issued instruction selection signal 507, a signal indicating the corresponding virtual processor. The issued instruction determining unit 702 repeats the aforementioned operations, and finally when there is no instruction group capable of being issued, it outputs a signal indicating the state as the issued instruction selection signal 507.

Figure 8:
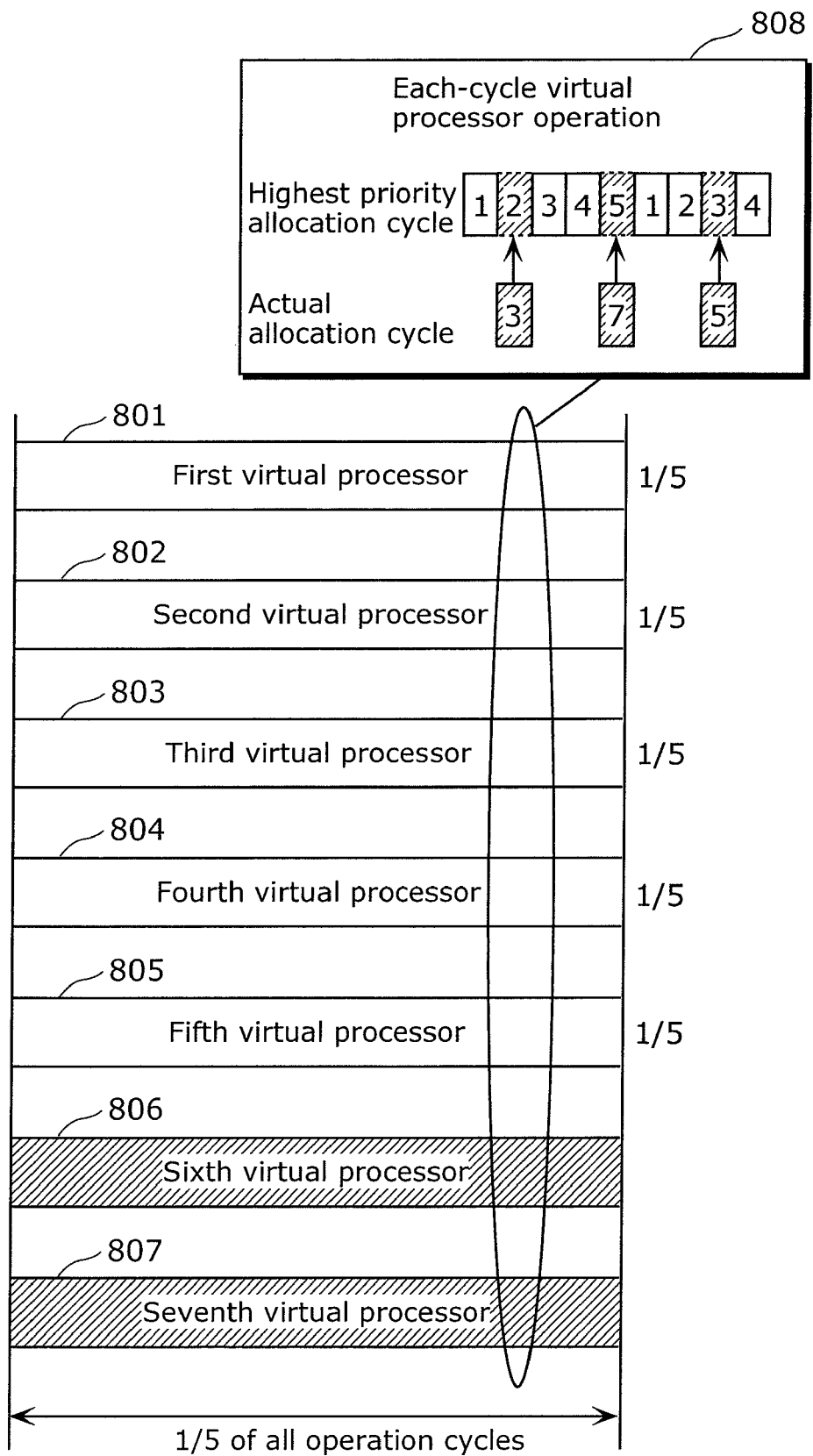
FIG. 8 is a diagram showing performance allocated for each virtual processor, in the multithreaded processor according to the second embodiment.

FIG. 8 is a diagram showing the performance allocated for each virtual processor, in the multithreaded processor according to the present embodiment.

As shown in FIG. 8, uniform and guaranteed performances 801 to 805 are allocated to each of the first virtual processor to the fifth virtual processor, while non-guaranteed performances 806 and 807 are allocated respectively to the sixth virtual processor and the seventh virtual processor.

Note that an each-cycle virtual processor operation 808 indicates virtual processor numbers allocated for each cycle, and determines the highest priority for each cycle in the order from the first virtual processor to the fifth virtual processor each corresponding to the virtual processor numbers registered in the first highest-to-lowest priority queue 703. Note that the second, the fifth, and the third virtual processors that are represented by broken lines indicate that no instruction is issued due to a reason, for example, that there is no instruction to be issued as described above, when an instruction is to be issued to the second, the fifth, and the third virtual processors. Thus, from among the virtual processors having issuable instructions, the virtual processor having the highest priority is allocated in the execution cycle. For example, instead of the second, the fifth, and the third virtual processors that are represented by broken lines, the third, the seventh, and the fifth virtual processors are allocated. Note that even when another virtual processor (for example, a virtual processor other than the third, seventh, and fifth virtual processors) is allocated, in the next cycle, a virtual processor having the highest priority in the cycle is selected. Accordingly, it is possible to guarantee execution of an instruction in a worst cycle in consideration of the latency of the instruction intended, in advance, by the software developer.

Third Embodiment

Next, the multithreaded processor according to the third embodiment of the present invention is to be described.

Although the multithreaded processor according to the third embodiment has the same configuration as the multithreaded processor according to the second embodiment, it differs in the operations of the priority determining unit 701. Thus, the following mainly describes the different points from the second embodiment.

The operations of the priority determining unit 701 and the issued instruction determining unit 702 are described using FIG. 7.

The specific examples of obtaining the priority information 701 using the priority determining unit 701 are to be described hereinafter.

The priority determining unit 701 determines priorities for every cycle based on the virtual processor numbers registered in the first highest-to-lowest priority queue 703 and virtual processor numbers registered in the second highest-to-lowest priority queue 705. The virtual processor numbers registered in the priority determining unit 703 and the second highest-to-lowest priority queue 705 are the same as those of the second embodiment.

In a cycle, the first highest priority pointer 704 points the second entry of the first highest-to-lowest priority queue 703, and the second highest priority pointer 706 points the second entry of the second highest-to-lowest priority queue 705. Here, the priority information 707 in this cycle becomes "2,7,6". In other words, the priority determining unit 701 obtains the first half of priority information 707 as "2" based on the first highest-to-lowest priority queue 703 and the first highest priority pointer 704. Furthermore, the priority determining unit 701 obtains the second half of priority information 707 as "7,6" based on the second highest-to-lowest priority queue 705 and the second highest priority pointer 706. Although the second half of the priority information 707 is obtained in the same manner as that of the second embodiment, the first half of the information is obtained in a different manner. In other words, only the virtual processor numbers stored in the entry of the second highest-to-lowest priority queue 705 indicated by the first highest priority pointer 704 are allocated for the first half of the priority information 707.

In the next cycle, the first highest priority pointer 704 advances one entry, pointing the third entry of the first highest-to-lowest priority queue 703, and the second highest priority pointer 706 advances one entry, pointing the first entry of the second highest-to-lowest priority queue 705. Note that although the transition of the first highest priority pointer 704 does not depend on whether or not an instruction is issued to a target virtual processor having the highest priority, the first highest priority pointer 704 is transitioned always in every cycle. On the other hand, the transition of the second highest priority pointer 706 does not depend on whether or not an instruction is issued to a virtual processor having the non-highest priority. Rather, the second highest priority pointer 706 may be transitioned always in every cycle, and it may be transitioned only when an instruction is issued. Furthermore, the priority information 707 in this cycle becomes "3,6,7". As such, a virtual processor number based on the first highest-to-lowest priority queue 703 is set as the number having the highest priority, and the next priority is set based on the second highest-to-lowest priority queue 705. The same processing is repeated, and when the first highest priority pointer 704 points the last entry in which the identifier "END" is stored, the first highest priority pointer 704 is transitioned to the first entry. When the second highest priority pointer 706 points the last entry in which the identifier "END" is stored, the second highest priority pointer 706 is transitioned to the first entry. In the present embodiment, although it is assumed that the virtual processor numbers of five virtual processors from the first virtual processor to the fifth virtual processor are respectively registered in the first highest-to-lowest priority queue 703, the same virtual processor numbers may be registered. Although it is assumed that the virtual processor numbers of the sixth virtual processor and the seventh virtual processor, which are not registered in the first highest-to-lowest priority queue 703, are respectively registered in the non-priority determining unit 705, the same virtual processor numbers may be registered.

The issued instruction determining unit 702 outputs an issued instruction selection signal 507 for selecting a virtual processor that issues an instruction in an operation cycle. Since the operations performed in the issued instruction determining unit 702 are the same as those of the second embodiment, the detailed description is not repeated herein.

Figure 9:
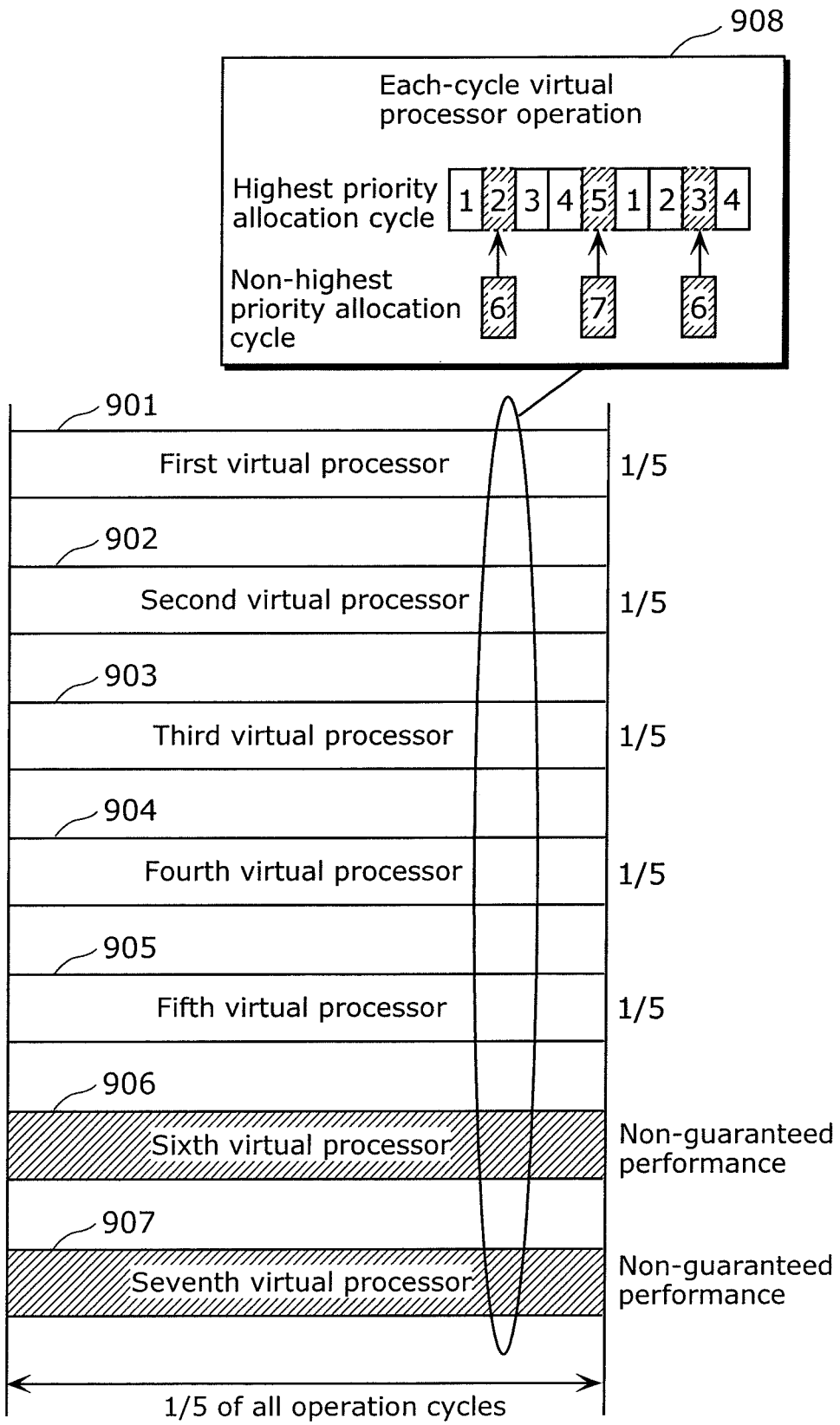
FIG. 9 is a diagram showing performance allocated for each virtual processor, in the multithreaded processor according to the third embodiment.

FIG. 9 is a diagram showing the performance allocated for each virtual processor, in the multithreaded processor according to the third embodiment.

As shown in FIG. 9, uniform and guaranteed performances 901 to 905 are allocated to each of the first virtual processor to the fifth virtual processor, while non-guaranteed performances 906 and 907 are allocated respectively to the sixth virtual processor and the seventh virtual processor.

Note that an each-cycle virtual processor operation 908 indicates virtual processor numbers allocated for each cycle.

Furthermore, the each-cycle virtual processor operation 908 indicates the determined highest priority for each cycle in the order from the first virtual processor to the fifth virtual processor each corresponding to the virtual processor numbers registered in the first highest-to-lowest priority queue 703. Note that when an instruction is to be issued to the second, the fifth, and the third virtual processors that are represented by broken lines, it is not possible to issue an instruction due to a reason, for example, that there is no instruction to be issued as described above. Thus, among the virtual processor numbers registered in the second highest-to-lowest priority queue 705, the virtual processor having the highest priority is allocated in the execution cycle. For example, instead of the second, the fifth, and the third virtual processors that are represented by broken lines, the sixth, the seventh, and the sixth virtual processors are allocated respectively. As such, even when the issued instruction determining unit 702 selects another virtual processor, in the next cycle, the issued instruction determining unit 702 selects a virtual processor having the second highest priority. Accordingly, it is possible to guarantee execution of an instruction in a worst cycle in consideration of the latency of the instruction intended, in advance, by the software developer.

With the aforementioned operations, it is possible to provide sufficient performance intended by the software developer for the virtual processors registered in the first highest-to-lowest priority queue 703, and to positively allocate the performance to the virtual processor that provides non-guaranteed performance registered in the second highest-to-lowest priority queue 705.

Fourth Embodiment

Next, the multithreaded processor according to the fourth embodiment of the present invention is to be described.

The multithreaded processor according to the fourth embodiment differs from the multithreaded processor according to the first embodiment in having the priority determining unit 701 used in the second and third embodiments instead of the priority determining unit 110, and in having an issued instruction determining unit 1005 instead of the issued instruction determining unit 111. Furthermore, it differs in the fine-grained multithreaded processing from that of the first to third embodiments. The fourth embodiment is to be described hereinafter, focusing on the different points from the aforementioned first to third embodiments.

Figure 10:
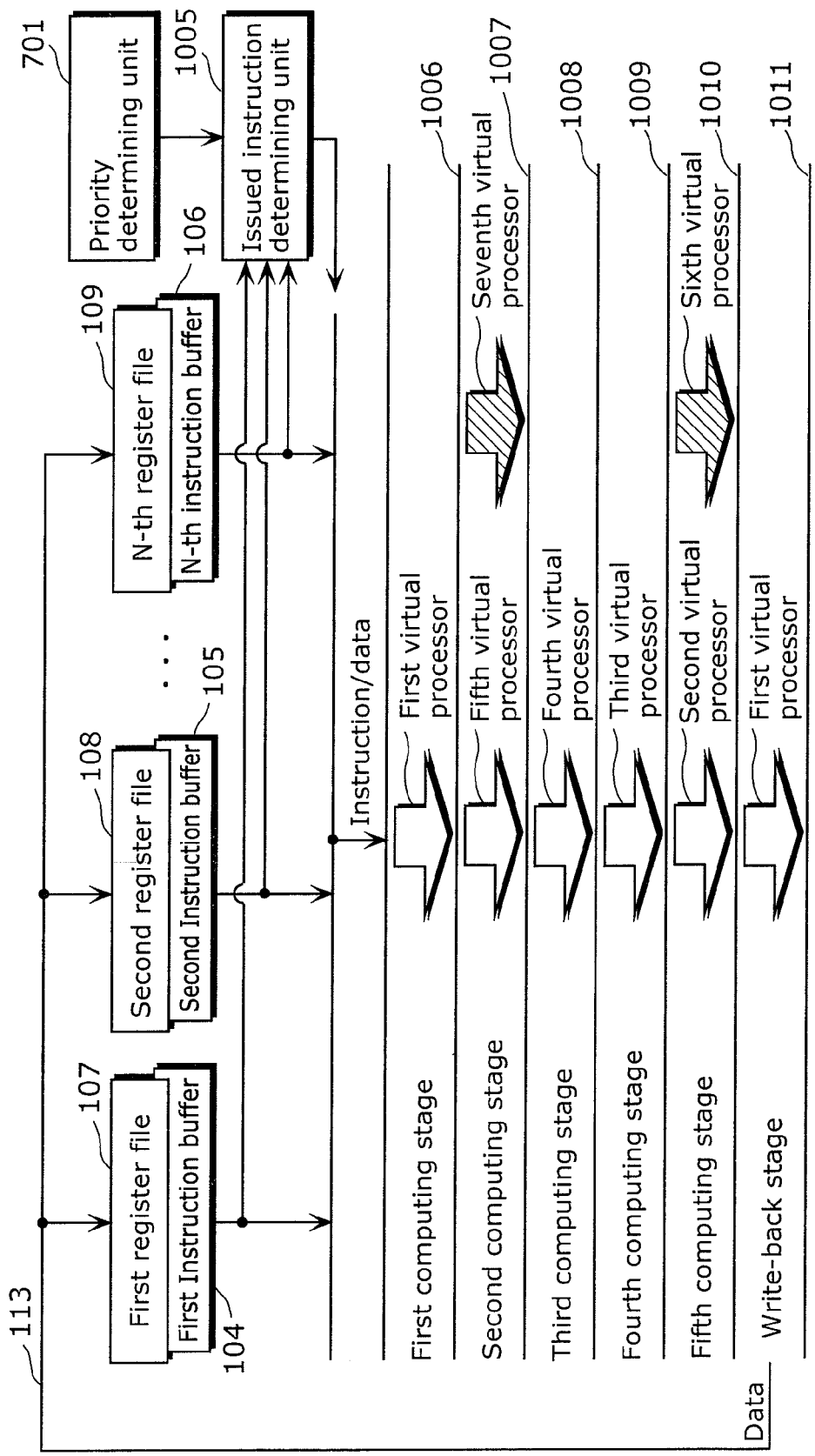
FIG. 10 is a diagram describing fine-grained multithreaded processing using the first instruction buffer to the N-th instruction buffer, the first register file to the N-th register file, the computing unit group, and the write-back bus according to the fourth embodiment.

FIG. 10 is a diagram describing the fine-grained multithreaded processing using the first instruction buffer 104 to the N-th instruction buffer 106, the first register file 107 to the N-th register file 109, the computing unit group 112, and the write-back bus 113.

The priority determining unit 701 is a processing unit that determines a priority of the N number of instruction streams, and outputs priority information. The configuration and operations of the priority determining unit 701 are the same as those described in the second and third embodiments, and any the configuration and operations may be used. Thus, the detailed description is not repeated herein.

The issued instruction determining unit 1005 implements virtual processors by selecting an instruction buffer in which an instruction of an instruction stream to be issued is held and a register file necessary for the instruction stream based on priority information received from the priority determining unit 701 and instruction buffer information indicating whether or not an instruction can be issued to the first instruction buffer 104 to the N-th instruction buffer 106.

In this case, the issued instruction determining unit 1005 checks the instruction buffer information 506 according to a priority of the priority information 707, and confirms whether or not there is a grouped instruction capable of being issued to the virtual processor having the highest priority. When the issuable grouped instruction is present, the issued instruction determining unit 1005 outputs, as the issued instruction selection signal 507, a signal that selects the virtual processor having the highest priority. Furthermore, the issued instruction determining unit 1005 confirms whether or not the issuable and grouped instruction is present, and checks whether or not grouped instructions that can be issued simultaneously are present, based on the instruction buffer information 506 in an order from the information having the higher priority. When the grouped instructions that can be issued simultaneously are present, the issued instruction determining unit 1005 simultaneously issues the grouped instructions. The aforementioned checking is, for example, performed as follows. In other words, it is checked whether or not the total number of instructions in threads to be issued simultaneously is equal to or less than the number of computing resources, and when this condition is satisfied, it is judged that the instructions can be issued simultaneously.

When a grouped instruction capable of being issued to the virtual processor having the highest priority is not present, the issued instruction determining unit 1005 confirms whether or not a grouped instruction capable of being issued to the virtual processor having the second highest priority is present. When the issuable grouped instruction is not present, the issued instruction determining unit 1005 outputs, as the issued instruction selection signal 507, a signal that selects the virtual processor having the second highest priority. In this case, similarly, the issued instruction determining unit 1005 confirms whether or not the issuable and grouped instruction is present, and checks whether or not grouped instructions that can be issued simultaneously are present, based on the instruction buffer information 506 in an order from the information having the higher priority. When the grouped instructions that can be issued simultaneously are present, the issued instruction determining unit 1005 simultaneously issues the grouped instructions.

The issued instruction determining unit 1005 repeats the aforementioned operations, and when there is no instruction group finally capable of being issued, and the issued instruction determining unit 1005 issues a signal indicating the state as the issued instruction selection signal 507.

Here, the multithreaded processor executes pipeline processing using the computing unit group 112. The number of stages is, for example, six including a first computing stage 1006, a second computing stage 1007, a third computing stage 1008, a fourth computing stage 1009, a fifth computing stage 1010, and a write-back stage 1011.

In each of the first computing stage 1006 to the fifth computing stage 1010, instructions included in the N number of instruction streams are executed.

Furthermore, processing for writing computing results performed in the first computing stage 1006 to the fifth computing stage 1010, back to one of the first register file 107 to the N-th register file 109 is executed in the write-back stage 1011 via the write-back bus 113.

As such, when the issued instruction determining unit 1005 switches instruction streams and issues the instruction streams successively in each of the pipelined computing stages, it becomes possible to implement virtual processors. For example, the first virtual processor that executes the first instruction stream is allocated to the first computing stage 1006. Furthermore, the fifth virtual processor that executes the fifth instruction stream and the seventh virtual processor that executes the seventh instruction stream are allocated to the second computing stage 1007.

Using such a multithreaded pipeline, it is possible to substantially reduce limitations for issuing an instruction that are caused by data dependencies.

Note that a difference between the fourth embodiment and the first to third embodiments is that instructions of virtual processors are present in an identical stage, such as the second and fifth computing stages. This occurs as a result of instructions of virtual processors being issued by the issued instruction determining unit 1005. This technique is generally referred to as Simultaneous Multi Threading (SMT), and the patent is characterized in that instructions are issued simultaneously for each grouped instruction.

Figure 11:
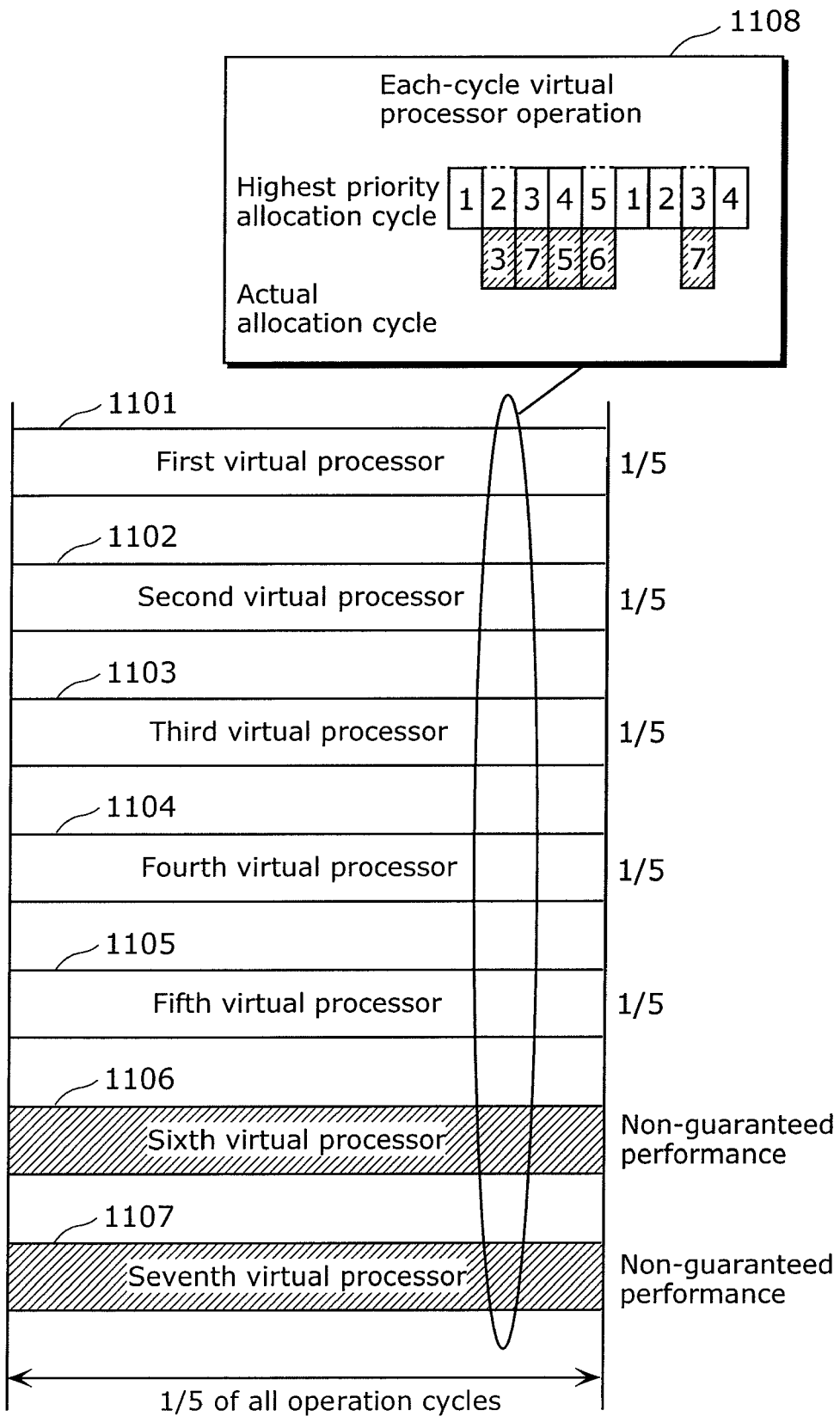
FIG. 11 is a diagram showing performance allocated for each virtual processor, in the multithreaded processor according to the fourth embodiment.

FIG. 11 is a diagram showing the performance allocated for each virtual processor, in the multithreaded processor according to the present embodiment.

As shown in FIG. 11, uniform and guaranteed performances 1101 to 1105 are allocated to each of the first virtual processor to the fifth virtual processor, while non-guaranteed performances 1106 and 1107 are allocated respectively to the sixth virtual processor and the seventh virtual processor.

Note that an each-cycle virtual processor operation 1108 indicates virtual processor numbers allocated for each cycle, and indicates the determined highest priority for each cycle in the order from the first virtual processor to the fifth virtual processor each corresponding to the virtual processor numbers registered in the first highest-to-lowest priority queue 703. Note that instructions are simultaneously issued to the third and seventh virtual processors. Note that instructions are also simultaneously issued to the fourth and fifth virtual processors. Furthermore, when instructions are issued to the second, the fifth, and the third virtual processors that are represented by broken lines, no instruction is issued due to a reason, for example, that there is no instruction to be issued as described in the aforementioined embodiments. Thus, from among the virtual processors having issuable instructions, the virtual processor having the highest priority is allocated in the execution cycle. For example, instead of the second, the fifth, and the third virtual processors that are represented by broken lines, the third, the sixth, and the seventh virtual processors are allocated.

Note that even when another virtual processor (for example, a virtual processor other than the third, the sixth, and the seventh virtual processors) is allocated, in the next cycle, a virtual processor having the highest priority in the cycle is selected. Accordingly, it is possible to guarantee execution of an instruction in a worst cycle in consideration of the latency of the instruction intended, in advance, by the software developer.

With the aforementioned operations, it is possible to provide sufficient performance intended by the software developer for the virtual processor registered in the first highest-to-lowest priority queue 703, and to positively allocate the performance to a virtual processor that provides non-guaranteed performance registered in the second highest-to-lowest priority queue 705.

Note that although instructions of the largest two virtual processors are simultaneously issued in each computing stage, the issuing method is not limited to this. As long as computing resources are available, it is possible to issue instructions of equal to or more than three virtual processors are simultaneously issued to a computing stage.

Fifth Embodiment

Next, the multithreaded processor according to the fifth embodiment of the present invention is to be described.

The multithreaded processor according to the fifth embodiment has the same configuration as that of the multithreaded processor according to the fourth embodiment shown in FIG. 10. Note that it differs in the operation of the issued instruction determining unit 1005.

When a grouped instruction capable of being issued to a virtual processor having the highest priority is not present in each execution cycle, the issued instruction determining unit 1005 according to the fourth embodiment issues the grouped instruction to the virtual processor, as long as the grouped instruction capable of being issued to another virtual processor is present.

Even when the grouped instruction capable of being issued to a virtual processor having the highest priority is not present in each execution cycle and grouped instruction capable of being issued to another virtual processor are present, the issued instruction determining unit 1005 according to the present embodiment never issues an instruction. In other words, the issued instruction determining unit 1005 outputs, as the issued instruction selection signal 507, a signal indicating that there is no instruction to be issued.

With such an operation, in an execution cycle in which an instruction is not issued, operations of the computing stages corresponding to the execution cycles of the first instruction buffer 104 to the N-th instruction buffer 106 and the first register file 107 to the N-th register file 109 are completely suspended. With this, it is possible to reduce electric power used in the multithreaded processor.

Figure 12:
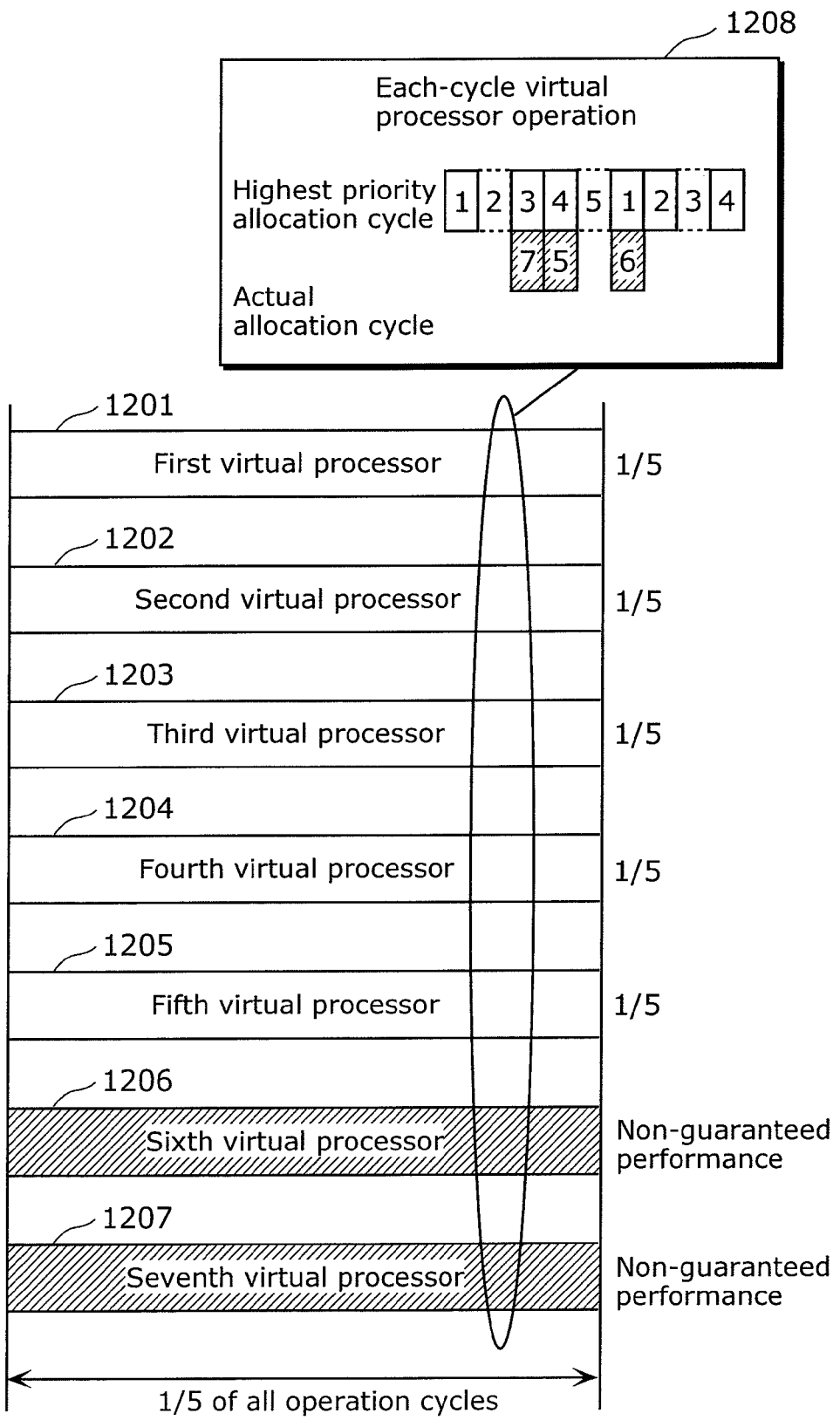
FIG. 12 is a diagram showing performance allocated for each virtual processor, in the multithreaded processor according to the fifth embodiment.

FIG. 12 is a diagram showing the performance allocated for each virtual processor, in the multithreaded processor according to the present embodiment.

As shown in FIG. 12, uniform and guaranteed performances 1201 to 1205 are allocated to each of the first virtual processor to the fifth virtual processor, while non-guaranteed performances 1206 and 1207 are allocated respectively to the sixth virtual processor and the seventh virtual processor.

The each-cycle virtual processor operation 1208 indicates virtual processor numbers allocated for each cycle. Furthermore, the each-cycle virtual processor operation 1208 indicates the determined highest priority for each cycle in the order from the first virtual processor to the fifth virtual processor each corresponding to the virtual processor numbers registered in the first highest-to-lowest priority queue 703. Note that instructions are simultaneously issued to the third and seventh virtual processors. Similarly, instructions are issued simultaneously to the fourth and the fifth virtual processors, and to the first and sixth virtual processors.

Furthermore, when instructions are issued to the second, fifth, and third virtual processors that are represented by broken lines, no instruction is issued due to a reason, for example, that there is no instruction to be issued as described in the previous embodiments and the like. Thus, an instruction is not issued.

Note that even when another virtual processor (for example, a virtual processor other than the second, fifth, and third virtual processors) is allocated and when a virtual processor is not allocated, in the next cycle, a virtual processor having the highest priority in the cycle is selected. Accordingly, it is possible to guarantee execution of an instruction in a worst cycle in consideration of the latency of the instruction intended, in advance, by the software developer.

With the aforementioned operations, it is possible to provide sufficient performance intended by the software developer for the virtual processor registered in the first highest-to-lowest priority queue 703, and to positively allocate the performance to the virtual processor that provides non-guaranteed performance registered in the second highest-to-lowest priority queue 705.

Sixth Embodiment

Next, the multithreaded processor according to the sixth embodiment of the present invention is to be described.

Although the multithreaded processor according to the sixth embodiment differs from the multithreaded processor according to the first embodiment shown in FIG. 1 in having a priority determining unit 1301 instead of the priority determining unit 110 and an issued instruction determining unit 1302 instead of the issued instruction determining unit 111. The sixth embodiment is to be described hereinafter, focusing on the different points from the aforementioned first to fifth embodiments.

Figure 13:
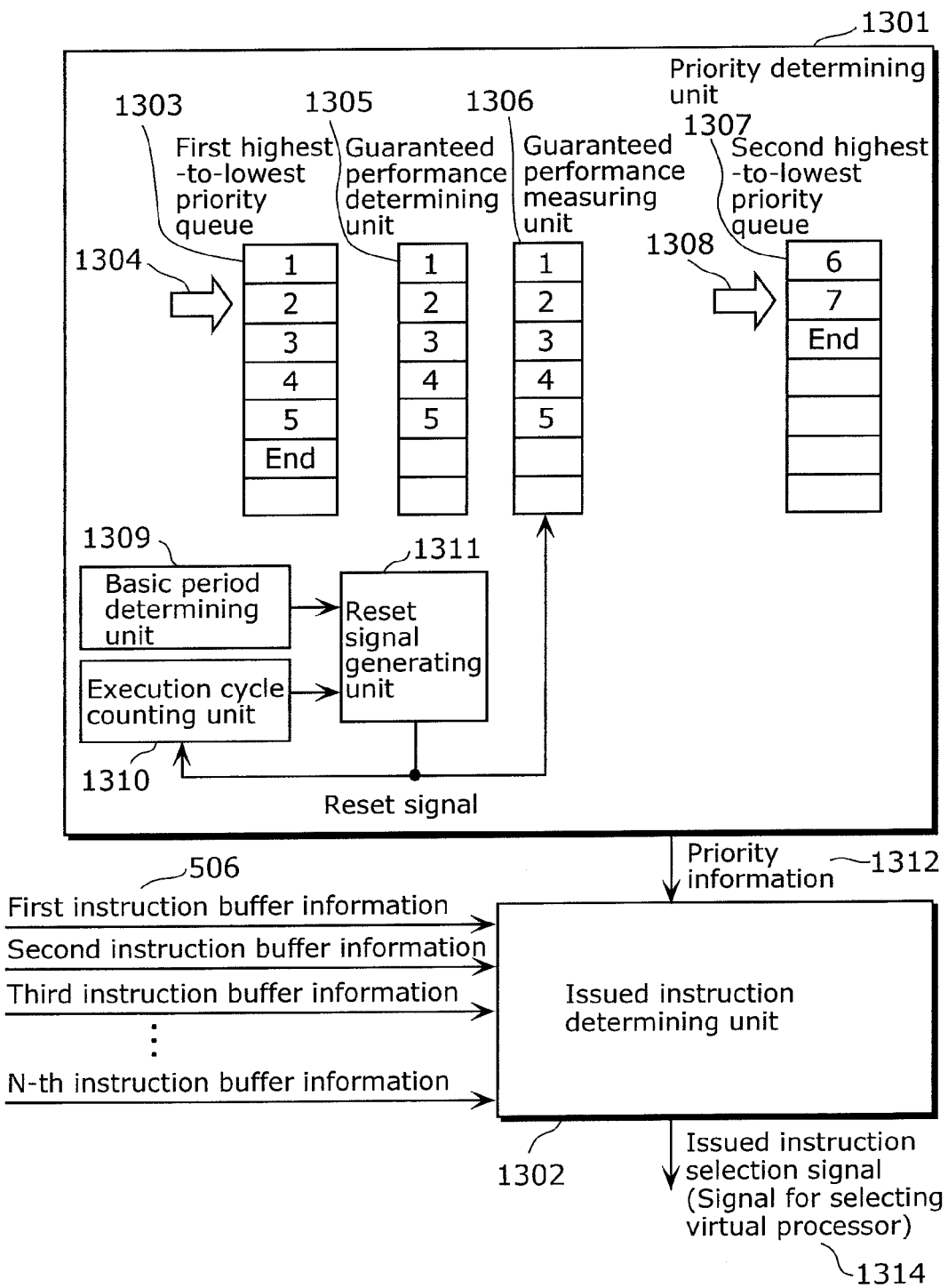
FIG. 13 is a diagram for describing configuration and operations of the priority determining unit and the issued instruction determining unit according to the sixth embodiment.

FIG. 13 is a diagram for describing configuration and operations of the priority determining unit 1301 and the issued instruction determining unit 1302.

The priority determining unit 1301 its a processing unit that determines a priority for the N number of instruction streams in each operation cycle, and outputs priority information 1312 indicating a priority of each virtual processor.

The issued instruction determining unit 1302 is provided, instead of the issued instruction determining unit 111 in the multithreaded processor shown in FIG. 1, and is a processing unit that implements a virtual processor. In other words, the issued instruction determining unit 1302 receives the priority information 1312 from the priority determining unit 1301, and receives instruction buffer information 506 indicating whether or not an instruction can be executed from each of the first instruction buffer 104 to the N-th instruction buffer 106. Furthermore, the issued instruction determining unit 1302 selects an instruction buffer in which an instruction of an instruction stream to be issued is held and a register file that is necessary for the instruction stream, based on the received priority information 1312 and the instruction buffer information 506.

The priority determining unit 1301 includes a first highest-to-lowest priority queue 1303, a guaranteed performance determining unit 1305, a guaranteed performance measuring unit 1306, a second highest-to-lowest priority queue 1307, a basic period determining unit 1309, an execution cycle counting unit 1310, and a reset signal generating unit 1311.

The first highest-to-lowest priority queue 1303 is a storing unit in which the number of virtual processors indicating priorities for issuing each of instructions (the number of threads and instruction streams) is stored. A first highest priority pointer 1304 points an entry to be a priority in the first highest-to-lowest priority queue 1303.

The guaranteed performance determining unit 1305 is a storing unit indicating how much performance is to be executed for each virtual processor with the first highest-to-lowest priority queue 1303.

The guaranteed performance measuring unit 1306 is a storing unit indicating how much performance has been implemented for each virtual processor with the first highest-to-lowest priority queue 1303.

The second highest-to-lowest priority queue 1307 is a storing unit in which the number of virtual processors where an instruction is not issued by priority is stored. The second highest priority pointer 1308 points an entry that stores the number of virtual processors in which an instruction to be issued is included, in the second highest-to-lowest priority queue 1307.

The basic period determining unit 1309 is a processing unit that determines a predetermined period for measuring performance.

The execution cycle counting unit 1310 is a processing unit that counts the number of execution cycles that is a predetermined period for measuring performance.

The reset signal generating unit 1311 is a processing unit that notifies the guaranteed performance measuring unit 1306 and the execution cycle counting unit 1310 of a reset signal, when the number of execution cycle that is counted in the execution cycle counting unit 1310 reaches basic cycles set in the basic period determining unit 1309. The guaranteed performance measuring unit 1306 and the execution cycle counting unit 1310 which have received the reset signal resets, to 0, the execution cycle held by itself.

The following describes operations in each processing unit in details. The guaranteed performance determining unit 1305 is a register capable of being set by software, has entries for each virtual processor, and sets, as an entry corresponding to the virtual processor, the number of operation cycles that are expected by each virtual processor. The guaranteed performance determining unit 1305 is set, in advance, with the virtual processor when the virtual processor starts to operate in a system status.

The guaranteed performance measuring unit 1306 has entries for each virtual processor, and counts up the entries when a cycle having the highest priority is allocated to the corresponding virtual processor, assuming that 0 is set as the initial state in each entry. The value in each entry is compared with the number of corresponding operation cycles stored in the guaranteed performance determining unit 1305, each time the number of each entry is counted up. When the numbers do not match, the same operation is continued. When the numbers match, the guaranteed performance measuring unit 1306 suspends the succeeding counting operation, and outputs a signal indicating that expected performance of the virtual processor corresponding to the entry having the matched value has been achieved.

The signal becomes a control signal for issuing an instruction of the corresponding virtual processor, and it is used in the following controls (1 to 3).

1. The virtual processor is excluded as a virtual processor that determines a priority using the first highest-to-lowest priority queue 1303, and is not regarded as a candidate to which an instruction is issued. In other words, information of the virtual processor is not included in the priority information 1312.

2. Among the priorities determined by the first highest-to-lowest priority queue 1303 and the second highest-to-lowest priority queue 1307, the lowest priority of the virtual processor is outputted as the priority information 1312.

3. Although the control signal is not used for controlling priorities, it is outputted to the issued instruction determining unit 1302 as a part of the priority information 1312. The issued instruction determining unit 1302 that receives the signal outputs an issued instruction selection signal 1314, assuming that the corresponding virtual processor does not hold an instruction.

The basic period determining unit 1309 is a register capable of being set by software, and sets a value indicating how much performance to be guaranteed, which is set by the guaranteed performance determining unit 1305 and the guaranteed performance measuring unit 1306, is expected in a cycle. The value is set, in advance, when the virtual processor starts to operate in a system status.

The execution cycle counting unit 1310 counts up the entries in each operation cycle, assuming that 0 is set as an initial state. Furthermore, the reset signal generating unit 1311 compares the value held in the execution cycle counting unit 1310 with the value stored in the basic period determining unit 1309, and when the values do not match, the same operation is continued. When the values match, the reset signal generating unit 1311 suspends the following counting operation, while outputting a signal indicating that a basic period determined by the basic period determining unit 1309 is achieved.

This signal indicating the completion of the basic period serves as initializing the guaranteed performance measuring unit 1306 and the execution cycle counting unit 1310. In other words, the signal serves as resuming measuring of performance to be guaranteed and counting of the execution cycles after the initialized state.

In addition to the aforementioned control, the method for determining the priority information 1312 is the same as one of the methods described in the second to fifth embodiments.

Furthermore, the method for determining the issued instruction selection signal 1314 using the issued instruction determining unit 1302 is the same as one of the methods described in the aforementioned embodiments. Thus, the detailed description is not repeated herein.

Figure 14:
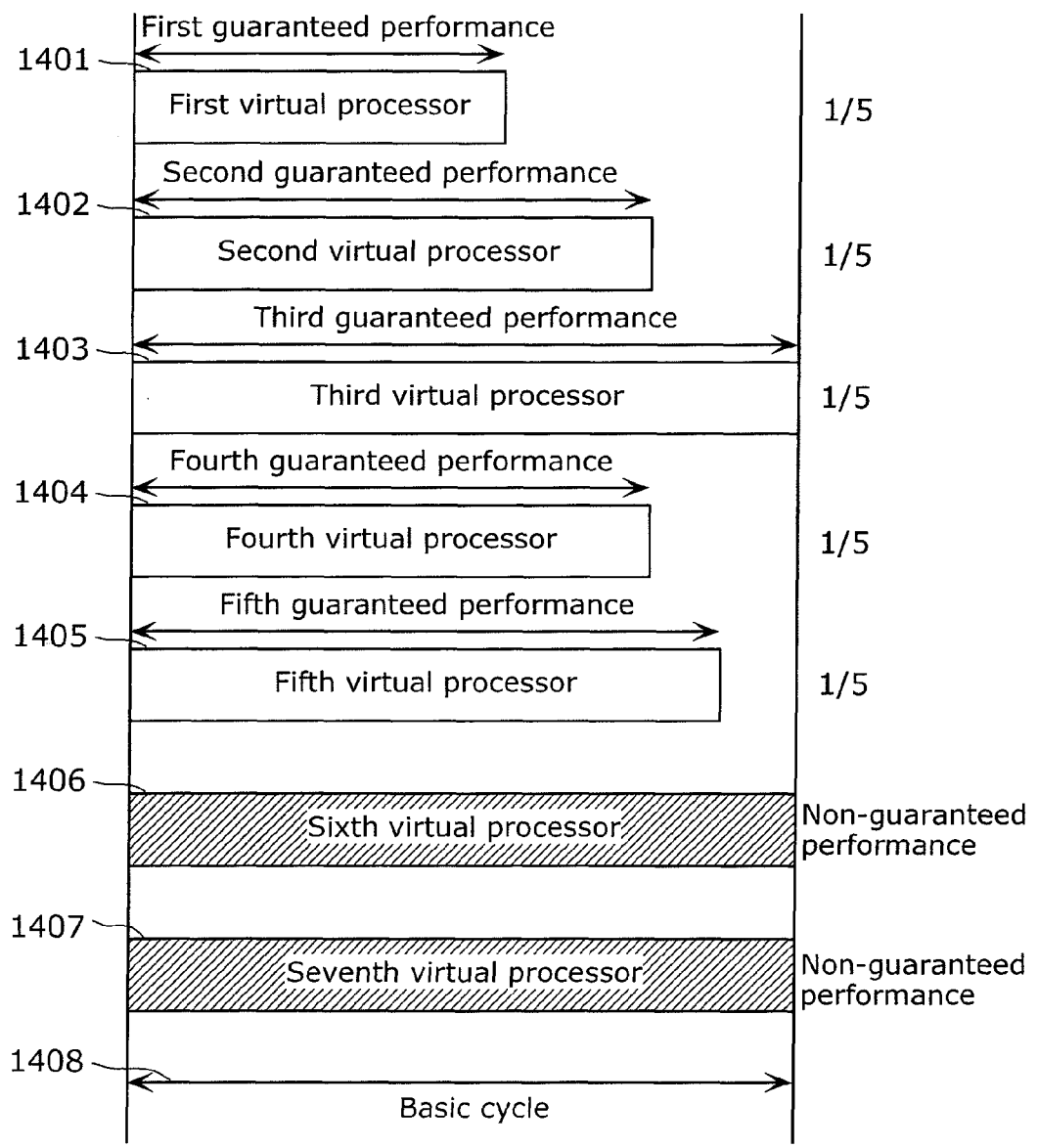
FIG. 14 is a diagram showing performance allocated for each virtual processor, in the multithreaded processor according to the sixth embodiment.

FIG. 14 is a diagram showing the performance allocated for each virtual processor, in the multithreaded processor according to the present embodiment.

As shown in FIG. 14, performances 1401 to 1405 are allocated to each of the first virtual processor to the fifth virtual processor, and the performances 1401 to 1405 are respectively equivalent to the first guaranteed performance to the fifth guaranteed performance that are set by the guaranteed performance determining unit 1305. On the other hand, non-guaranteed performances 1406 and 1407 are allocated respectively to the sixth virtual processor and the seventh virtual processor.

As described, the present embodiment is characterized in that the guaranteed performance determining unit 1305 defines performances to be guaranteed for the virtual processors 1401 to 1405, and allocates uneven guaranteed performances to the virtual processors 1401 to 1405. Thus, it is possible to provide sufficient performance intended by the software developer for the virtual processor registered in the first highest-to-lowest priority queue 1303, and to positively allocate the performance to the virtual processor that provides non-guaranteed performance registered in the second highest-to-lowest priority queue 1307.

Seventh Embodiment

Next, a real-time processing system according to the seventh embodiment of the present invention is to be described.

Figure 15:
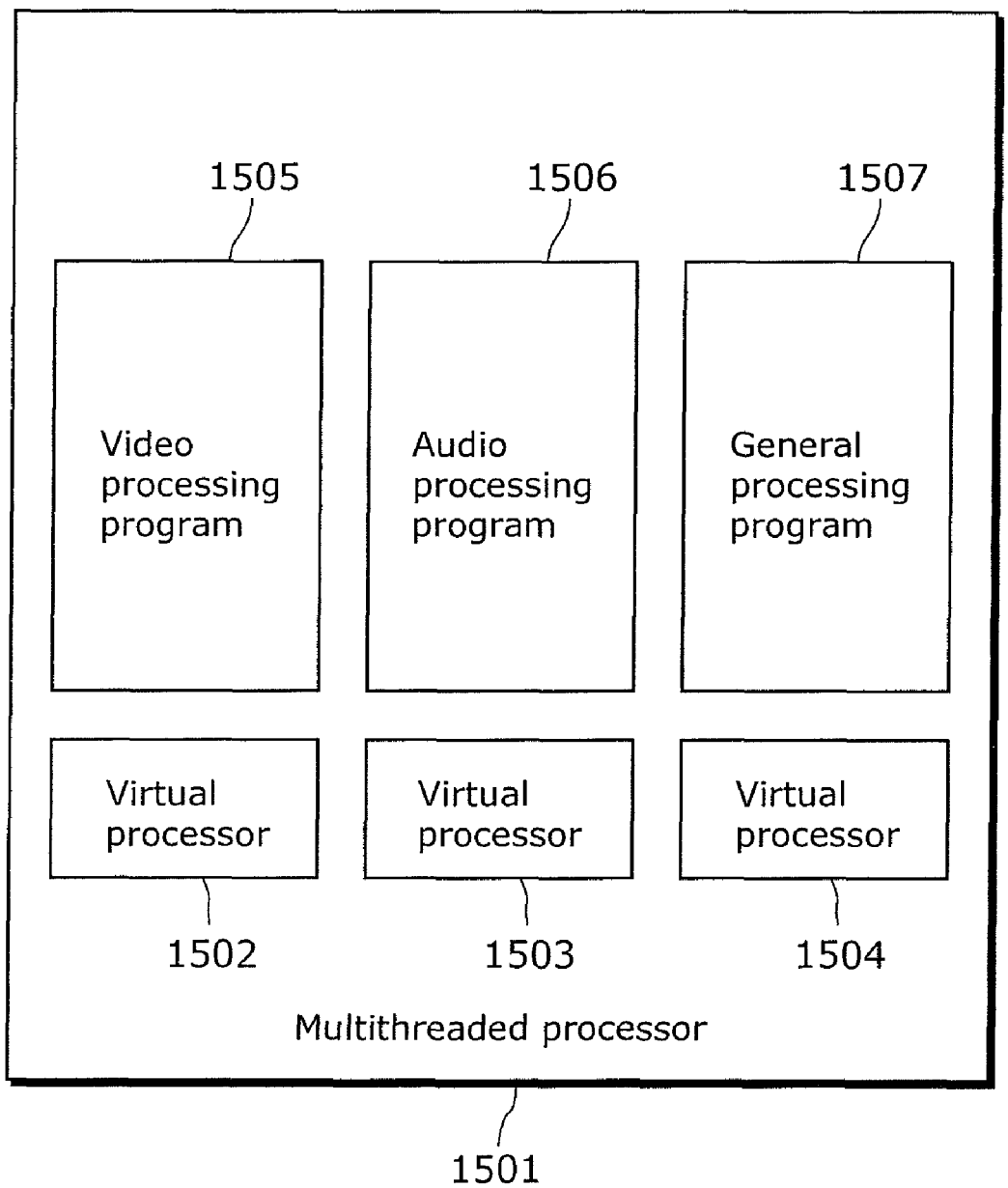
FIG. 15 is a block diagram showing configuration of a real-time processing system according to the seventh embodiment.

FIG. 15 is a block diagram showing the configuration of the real-time processing system. The real-time processing system according to the present embodiment is, for example, a system for reproducing a motion picture and audio, and a system using the multithreaded processor described in one of the first to sixth embodiments.

A multithreaded processor 1501 includes virtual processors 1502, 1503, and 1504. Each of the virtual processors 1502 and 1503 is a virtual processor that guarantees sufficient performance intended by the software developer, and the virtual processor 1504 is a virtual processor that is not guaranteed and in which non-guaranteed performance is given.

In each of the virtual processor 1502 and 1503 in which performance is guaranteed, time constraint processing is respectively executed, that is, a video processing program 1505 that decodes a moving image and an audio processing program 1506 that decodes audio. Furthermore, a general processing program 1507 other than the aforementioned time constraint processing is executed in the virtual processor 1504 in which non-guaranteed performance is given.

For example, the processing implemented by the general processing program 1507 includes On Screen Display (OSD), and channel switching processing, and the like, in the case where the multithreaded processor 1501 is, for example, applied to a digital television and a DVD recorder.

With the aforementioned configuration, it is possible to realize high speed and flexible processing by allocating necessary performance to a program in which performance should be guaranteed while allocating other performance as much as possible to a program in which performance need not be guaranteed, thereby improving the entire throughput of the multithreaded processor.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

Since the multithreaded processor according to the present invention has a function that implements flexible and high-performance computing processing, it can be used as a multithreaded processor and the like that performs media processing on video and audio in a DVD recorder, digital television, and the like.

What is claimed is:

1. A multithreaded processor that executes instruction streams simultaneously, said multithreaded processor comprising:
    a computing unit group comprising computing units operable to execute instructions;
    a grouping unit operable to group the instruction streams into groups for each of the instruction streams, the instructions being included in each of the instruction streams, and each of the groups being made up of instructions to be simultaneously issued to the computing units in said computing unit group in each of execution cycles of said multithreaded processor;
    an instruction buffer which holds the instructions for each of the groups obtained by said grouping unit;
    an instruction issuing unit operable to read the instructions for each of the groups from said instruction buffer in each of the execution cycles of said multithreaded processor, and to issue the read instructions to said computing unit group;
    a first priority queue which stores first identifiers for each of the instruction streams; and
    a priority determining unit operable to select at least one of the first identifiers from said first priority queue by prioritizing the first identifiers and switching priorities of the first identifiers in each of the execution cycles of said multithreaded processor, and to determine at least one of the selected first identifiers as priority information,
    wherein said instruction issuing unit is operable in each of the execution cycles of said multithreaded processor:
    (i) to determine an instruction stream based on the priority information determined by said priority determining unit;
    (ii) to read, from said instruction buffer, a group of instructions included in the determined instruction stream; and (iii) to issue the read instructions to said computing unit group.

2. The multithreaded processor according to claim 1, wherein said instruction issuing unit is operable to read, from said instruction buffer, a group of instructions included in an instruction stream that has the highest priority among the instruction streams held in said instruction buffer that holds instructions to be issued to said computing unit group, for each of the execution cycles of said multithreaded processor based on the priority information determined by said priority determining unit, and to issue the read instructions to said computing unit group.

3. The multithreaded processor according to claim 1, further comprising
a second priority queue which stores second identifiers for each of the instruction streams; and
wherein said priority determining unit is operable:
(i) to set a priority of a first identifier included in said first priority queue to be higher than a priority of a second identifier included in said second priority queue;
(ii) to select at least one of the second identifiers from said first priority queue and said second priority queue by prioritizing the second identifiers and switching priorities of the second identifiers in each of the execution cycles of said multithreaded processor; and
(iii) to determine at least one of the selected second identifiers as the priority information.

4. The multithreaded processor according to claim 3, wherein said priority determining unit is operable:
(i) to set the priority of the first identifier included in said first priority queue to be higher than the priority of the second identifier included in said second priority queue;
(ii) to select all of the first and second identifiers respectively included in said first priority queue and included in said second priority queue by prioritizing the identifiers and switching priorities of the first and second identifiers in each of the execution cycles of said multithreaded processor; and
(iii) to determine the selected first and second identifiers as the priority information, and
said instruction issuing unit is operable to read, from said instruction buffer, a group of instructions included in an instruction stream that has the highest priority among the instruction streams held in said instruction buffer that holds instructions to be issued to said computing unit group, for each of the execution cycles of said multithreaded processor based on the priority information determined by said priority determining unit, and to issue the read instructions to said computing unit group.

5. The multithreaded processor according to claim 3, wherein said priority determining unit is operable:
(i) to set the priority of the first identifier included in said first priority queue to be higher than the priority of the second identifier included in said second priority queue;
(ii) to select one of the first identifiers included in said first priority queue and all of the second identifiers included in said second priority queue by prioritizing the first and second identifiers and switching priorities of the first and second identifiers in each of the execution cycles of said multithreaded processor; and
(iii) to determine the selected first and second identifiers as the priority information, wherein said instruction issuing unit is operable to read, from said instruction buffer, a group of instructions included in an instruction stream that has the highest priority among the instruction streams held in said instruction buffer that holds instructions to be issued to said computing unit group, for each of the execution cycles of said multithreaded processor based on the priority information determined by said priority determining unit, and to issue the read instructions to said computing unit group.

6. The multithreaded processor according to claim 3, wherein said instruction issuing unit is operable, in each of the execution cycles of said multithreaded processor: to issue a first group of instructions based on the priority information determined by said priority determining unit, when the first group of instructions to be issued to said computing unit group is held in said instruction buffer, the first group of instructions being included in an instruction stream having the highest priority among the instruction streams; and simultaneously to issue a second group of instructions included in an instruction stream having the highest priority among the instruction streams other than the instruction stream including the first group of instructions to be issued, the second group of instructions being issued to said computing unit group simultaneously with the first group of instructions.

7. The multithreaded processor according to claim 6, wherein said instruction issuing unit is operable, in each of the execution cycles of said multithreaded processor: to read a third group of instructions from said instruction buffer based on the priority information determined by said priority determining unit, when the first group of instructions to be issued to said computing unit group is not held in said instruction buffer, the third group of instructions included in the instruction stream having the highest priority among the instruction streams held in said instruction buffer in which an instruction to be issued to said computing unit group is stored, the instruction streams excluding the instruction stream that includes the first group of instructions; and to issue the read third group of instructions to said computing unit group.

8. The multithreaded processor according to claim 6, wherein said instruction issuing unit is operable to stop issuing a group of instructions in each of the execution cycles of said multithreaded processor, based on the priority information determined by said priority determining unit, when the first group of instructions to be issued to said computing unit group is not held in said instruction buffer.

9. The multithreaded processor according to claim 1, further comprising:
a guaranteed performance determining unit operable to indicate performance to be guaranteed for the instruction streams; and
a performance measuring unit operable to measure performance with which the instruction streams have been executed,
wherein said priority determining unit or said instruction issuing unit is operable to change a method for issuing instructions to said computing unit group, when the performance measured by said performance measuring unit achieves the performance to be guaranteed that is indicated by said guaranteed performance determining unit.

10. The multithreaded processor according to claim 9,
wherein said priority determining unit is operable to change the priority information when the performance measured by said performance measuring unit achieves the performance to be guaranteed that is indicated by said guaranteed performance determining unit.

11. The multithreaded processor according to claim 10,
wherein said priority determining unit is operable, when the performance measured by said performance measuring unit achieves the performance to be guaranteed that is indicated by said guaranteed performance determining unit, to eliminate a first identifier of an instruction stream in which the measured performance achieves the performance to be guaranteed, and to determine the priority information from the next execution cycle.

12. The multithreaded processor according to claim 10,
wherein said priority determining unit is operable, when the performance measured by said performance measuring unit achieves the performance to be guaranteed that is indicated by said guaranteed performance determining unit, to set, to be the lowest, a priority of the instruction stream in which the measured performance achieves the performance to be guaranteed, and to determine the priority information from the next execution cycle.

13. The multithreaded processor according to claim 9,
wherein said instruction issuing unit is operable, when the performance measured by said performance measuring unit achieves the performance to be guaranteed that is indicated by said guaranteed performance determining unit, to issue an instruction of another instruction stream to said computing unit group, assuming that an instruction of an instruction stream in which the measured performance achieves the performance to be guaranteed is not present.

14. The multithreaded processor according to claim 9,
wherein said performance measuring unit is operable to count the number of times an instruction of the instruction stream is issued from said instruction issuing unit so as to measure performance that has been executed to the instruction stream.

15. The multithreaded processor according to claim 9,
further comprising:
a basic period determining unit operable to determine a predetermined basic period;
a execution cycle counting unit operable to count the number of the execution cycles:
a reset unit operable to reset, to an initial state, the number of the execution cycles counted by said execution cycle counting unit and the performance measured by said performance measuring unit, when the number of the execution cycles reaches the basic period determined by said basic period determining unit.

16. A real-time processing system which includes a multithreaded processor that executes instruction streams simultaneously, said system comprising:
a computing unit group comprising computing units operable to execute instructions;
a grouping unit operable to group the instruction streams into groups for each of the instruction streams, the instructions being included in each of the instruction streams, and each of the groups being made up of instructions to be simultaneously issued to the computing units in said computing unit group in each of execution cycles of said multithreaded processor;
an instruction buffer which holds the instructions for each of the groups obtained by said grouping unit, the instructions being included in one of the instruction streams;
an instruction issuing unit operable, in each of the execution cycles of said multithreaded processor, to read the instructions for each of the groups from said instruction buffer, and to issue the read instructions to said computing unit group;
a first priority queue which stores respective first identifiers of the instruction streams in each of which real-time processing is necessary; and
a second priority queue which stores respective second identifiers of the instruction streams in each of which the real-time processing is not necessary,
wherein said priority determining unit is operable:
(i) to set a priority of a first identifier included in said first priority queue to be higher than a priority of a second identifier included in said second priority queue;
(ii) to select at least one of the first and second identifiers respectively from said first priority queue and said second priority queue by prioritizing the first and second identifiers and switching priorities of the first and second identifiers in each of the execution cycles of said multithreaded processor; and
(iii) to determine at least one of the selected first and second identifiers as priority information, and
said instruction issuing unit is operable, in each of the execution cycles of said multithreaded processor:
(i) to determine an instruction stream based on the priority information determined by said priority determining unit;
(ii) to read, from said instruction buffer, a group of instructions included in the determined instruction stream; and
(iii) to issue the read instructions to said computing unit group.

17. The real-time processing system according to claim 16,
wherein the instruction stream in which the real-time processing is necessary is an instruction stream for decoding or encoding one of a video signal and an audio signal.

18. A method for issuing an instruction for use in a processor that executes instruction streams simultaneously, said method comprising:
grouping instruction streams into groups for each of the instruction streams, the instructions being included in each of the instruction streams, and each of the groups being made up of instructions to be simultaneously issued to the computing units in the computing unit group in each of execution cycles of the processor;
storing, in an instruction buffer, the instructions for each of the groups obtained in said grouping;
reading the instructions for each of the groups from the instruction buffer, and issuing the read instructions to the computing unit group, in each of the execution cycles of the processor;
storing first identifiers for each of the instruction streams in a first priority queue; and
selecting at least one of the first identifiers from the priority queue by prioritizing the first identifiers and switching priorities of the first identifiers in each of the execution cycles of the processor, and determining at least one of the first identifiers as priority information,
wherein, in each of the execution cycles of the processor, said reading the instructions for each of the groups from the instruction buffer comprises:
(i) determining an instruction stream based on the priority information determined by said selecting at least one of the first identifiers from the priority queue;

(ii) reading, from the instruction buffer, a group of instructions included in the determined instruction stream; and
(iii) issuing the read instructions to the computing unit group.

19. A program product having memory that stores instructions which, when loaded into a multithreaded processor, allows the multithreaded processor to execute a method for executing instruction streams simultaneously, the method which includes:

grouping instruction streams into groups for each of the instruction streams, the instructions being included in each of the instruction streams, and each of the groups being made up of instructions to be simultaneously issued to the computing units in the computing unit group in each of execution cycles of said multithreaded processor;

storing, in an instruction buffer, the instructions for each of the groups obtained in said grouping;

reading the instructions for each of the groups from the instruction buffer, and issuing the read instructions to the computing unit group, in each of execution cycles of the multithreaded processor;

storing first identifiers for each of the instruction streams in a first priority queue; and selecting at least one of the first identifiers from the priority queue by prioritizing the first identifiers and switching priorities of the first identifiers in each of the execution cycles of the multithreaded processor, and determining at least one of the selected first identifiers as priority information, wherein, in each of the execution cycles of the multithreaded processor, said reading the instructions for each of the groups from the instruction buffer comprises:
(i) determining an instruction stream based on the priority information determined by said selecting at least one of the first identifiers from the priority queue;
(ii) reading, from the instruction buffer, a group of instructions included in the determined instruction stream; and
(iii) issuing the read instructions to the computing unit group.

* * * * *